(12) United States Patent
Miyamoto et al.

(10) Patent No.: US 6,200,673 B1
(45) Date of Patent: Mar. 13, 2001

(54) MAGNETO-OPTICAL RECORDING MEDIUM

(75) Inventors: Harukazu Miyamoto, Hachioji; Toshio Niihara, Sayama; Motoyasu Terao, Nishitama-gun; Norio Ohta, Kitasoma-gun; Masaaki Kurebayashi, Ebina, all of (JP)

(73) Assignees: Hitachi, Ltd., Tokyo; Hitachi Maxell, Ltd., Osaka-fu, both of (JP)

( * ) Notice: Subject to any disclaimer, the term of this patent is extended or adjusted under 35 U.S.C. 154(b) by 0 days.

(21) Appl. No.: 07/607,870

(22) Filed: Nov. 1, 1990

(30) Foreign Application Priority Data

| Nov. 13, 1989 | (JP) | 1-292451 |
| Dec. 25, 1989 | (JP) | 1-332745 |
| Jan. 22, 1990 | (JP) | 2-12238 |

(51) Int. Cl.$^7$ ........................................ G11B 5/66
(52) U.S. Cl. ................. 428/332; 428/336; 428/694 ML; 428/694 MM; 428/694 IS; 369/13; 369/14; 369/283
(58) Field of Search ................... 425/900, 332, 425/336, 694 ML, 691 MM, 694 IS; 369/13, 14, 283

(56) References Cited

U.S. PATENT DOCUMENTS

| 4,645,722 | * | 2/1987 | Katayama et al. | 428/694 ML |
| 4,664,977 | * | 5/1987 | Osato et al. | 428/336 |
| 4,855,975 | * | 8/1989 | Akasaka et al. | 369/13 |

FOREIGN PATENT DOCUMENTS

| 282356 | 9/1988 | (EP) . |
| 243840 | * 12/1985 | (JP) . |
| 175948 | * 8/1987 | (JP) . |
| 258978 | * 3/1988 | (JP) . |

* cited by examiner

Primary Examiner—Leszek Kiliman
(74) Attorney, Agent, or Firm—Antonelli, Terry, Stout & Kraus, LLP

(57) ABSTRACT

A magneto-optical recording medium having a substrate and a magnetic layer composed of at least a recording layer and a supporting layer and being capable of retrieving information by utilizing the fact that when it is irradiated with a laser beam it produces the magneto-optical effect which affects its reflected light, characterized in that the recording layer has a lower Curie temperature than has the supporting layer and recording layer is thin enough for the laser beam to pass through.

A magneto-optical recording medium as defined above, wherein the supporting layer is composed of a first supporting layer and a second supporting layer, and the recording layer, the first supporting layer, and the second supporting layer have Curie temperatures of $T_1$, $T_2$, and $T_3$, respectively, which satisfy the following relationship.

$$T_1 < T_2 \text{ and } T_2 \geq T_3$$

A magneto-optical recording medium defined as above, wherein the recording layer has a higher Curie temperature than has the supporting layer.

Owing to the above-mentioned features, the magneto-optical recording media of the present invention are capable of overwriting and have improved recording sensitivity.

9 Claims, 12 Drawing Sheets

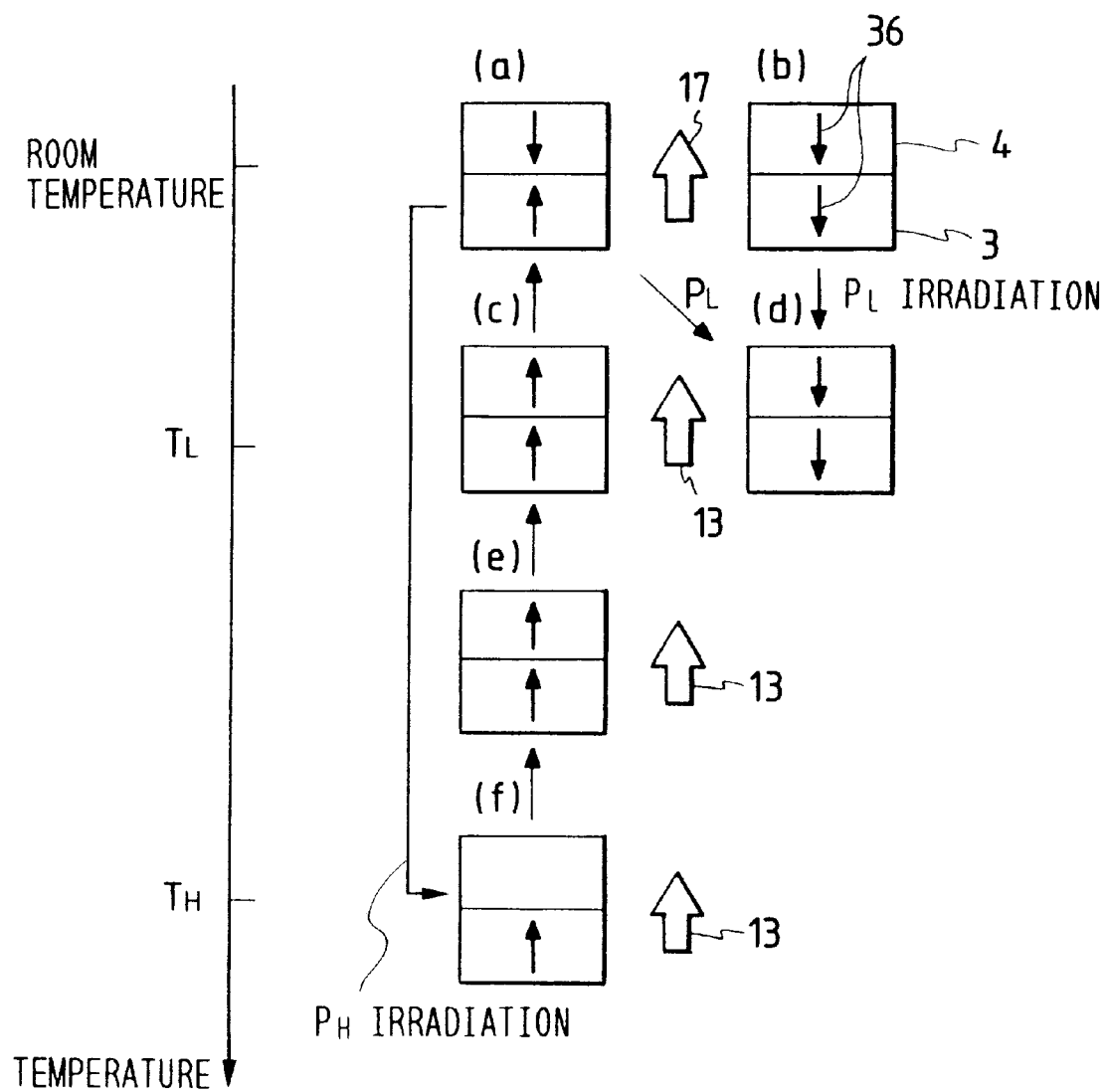

MAGNETO-OPTICAL RECORDING MEDIUM

BACKGROUND OF THE INVENTION

The present invention relates to a magneto-optical recording medium for recording drives. More particularly, it is concerned with a magneto-optical recording medium having double magnetic layers and being capable of over-writing with a single laser beam.

A conventional magneto-optical recording medium having double magnetic layers is disclosed in Japanese Patent Laid-open No. 175948/1987. It has a structure as shown in FIG. 2. It is composed of a transparent substrate 1 (glass or the like) having tracking grooves and four thin layers consecutively formed thereon, each designated as a first dielectric layer 2 of silicon nitride (ca. 90 nm thick), a recording layer 3 of TbFeCo (ca. 100 nm thick), a supporting layer 4 of TbDyFeCo (ca. 150 nm thick), and a second dielectric layer 5 of silicon nitride (ca. 200 nm thick).

The four thin layers have the following functions. The first dielectric layer 2 causes the laser light incident on the transparent substrate 1 to undergo multiple reflection in the layer, so as to increase the angle of rotation (Kerr rotation) of the plane of polarized light by the recording layer 3. The recording layer 3 is thick enough (ca. 100 nm) to prevent the transmission of light, so that the light does not reach the supporting layer 4 and the plane of polarized light rotates in response to the direction of magnetization in the recording layer 3. The second dielectric layer 5 protects the recording layer 3 and the supporting layer 4 from corrosion (e.g., oxidation). The supporting layer 4 is in exchange coupling with the recording layer 3 through exchange interaction.

The recording layer 3 and supporting layer 4 are formed such that the former has a lower Curie temperature than has the latter and the former has a greater coercive force than has the latter at room temperature. For this reason, the direction 14a of magnetization in the supporting layer 4 align irrespective of the direction 14b of magnetization in the recording layer 3, upon mere application of the initializing field by a permanent magnet, as shown in FIGS. 8(a) and (b).

When the recording medium of this type is irradiated with a laser beam of comparatively low intensity, the recording layer 3 heats up to a temperature (T) which is higher than the Curie temperature. (FIG. 8(c)) Therefore, in the subsequent cooling process, the direction 14a of magnetization in the recording layer 3 aligns with the direction 14b of magnetization in the supporting layer 4. (FIG. 8(e)) On the other hand, when the recording medium is irradiated with a laser beam of comparatively high intensity, the supporting layer 4 heats up to a temperature (T) which is higher than the Curie temperature. (FIG. 8(d)) Therefore, in the subsequent cooling process, the direction 14a of magnetization in the supporting layer 4 aligns with the direction 13 of the recording field externally applied by means of a permanent magnet. (FIG. 8(f)) Upon further cooling, the direction 14b of magnetization in the recording layer 3 aligns with the direction 14a of magnetization in the supporting layer 4. (FIG. 8(g)) Thus the direction of magnetization in the recording layer 3 can be reversed as desired according as the intensity of laser beam is modulated. This is the fundamental mechanism which permits overwriting with a single laser beam. A detailed description of this method will be found in Japanese Patent Laid-open No. 175948/1987.

The conventional recording medium mentioned above has several disadvantages arising from its thick recording layer 3. The thick recording layer 3 needs a laser beam of high intensity for recording on account of its high heat capacity. Also, the thick recording layer 3 gets hot sharply at its center when irradiated with a laser beam, as shown in FIG. 9. This local heating degrades the magnetic properties and read-out characteristics of the recording layer 3 and supporting layer 4 after repeated overwriting. Moreover, the thick recording layer 3 only permits the use of Kerr rotation due to surface reflection as the magneto-optical effect. (Kerr rotation is not large enough to secure a sufficient carrier-to-noise ratio.)

On the other hand, reducing the thickness of the recording layer 3 causes the supporting layer 4 to produce reflected rays which adversely affect read-out. In other words, the supporting layer 4 changes the angle of rotation of the plane of polarization of laser light depending on the direction of its magnetization. Therefore, the use of double magnetic layers for overwriting might bring about a situation in which the direction of magnetization in the supporting layer 4 is opposite at the time of reproduction from that immediately after overwriting. This situation makes it difficult to perform the read-out for verification immediately after overwriting using double beams. The read-out for verification is possible only after the disk has made a turn during which the direction of magnetization in the supporting layer 4 aligns. In other words, the read-out for verification needs an additional turn of the disk (and hence the recording needs two turns of the disk in total). This leads to a slow data processing speed.

Another disadvantage of the conventional recording medium is that the supporting layer should be thicker than the recording layer, with the total thickness of the magnetic layers being 150–300 nm. This leads to a low recording sensitivity.

Further another disadvantage of the conventional recording medium is that the Curie temperature of the recording layer 3 should be lower than that of the supporting layer 4. This makes it impossible to increase the Kerr rotation that occurs when the recording layer 3 is irradiated with a laser beam. Therefore, the conventional recording medium has a low C/N ratio. (Note that there is a relationship between the C/N ratio and the Curie temperature as shown in FIG. 22.) If the Curie temperature of the recording layer 3 is to be increased, it is necessary to increase the Curie temperature of the supporting layer 4, too. However, the supporting layer 4 with an excessively high Curie temperature reduces the recording sensitivity.

SUMMARY OF THE INVENTION

The present invention has three aspects. It is an object of the first aspect of the present invention to provide a high-sensitivity magneto-optical recording medium capable of overwriting with a laser beam of low intensity. It is another object of the first aspect of the present invention to provide a high-reliability magneto-optical recording medium which does not degrade in recording-reproducing characteristics even after repeated rewriting and overwriting. It is another object of the first aspect of the present invention to provide a magneto-optical recording medium having a high C/N ratio owing to the great angle of rotation of the plane of polarization of the reflected light. It is another object of the first aspect of the present invention to provide a magneto-optical recording medium capable of performing the read-out for verification immediately after overwriting.

It is an object of the second aspect of the present invention to provide a magneto-optical recording medium having two films (which are in exchange coupling with each other) for improved recording sensitivity. It is another object of the second aspect of the present invention to provide a magneto-optical recording medium capable of overwriting with an improved recording sensitivity.

It is an object of the third aspect of the present invention to provide a high C/N magneto-optical recording medium which produces a large angle of Kerr rotation without lowering the recording sensitivity.

The first aspect of the present invention is achieved by a magneto-optical recording medium defined in the following.

(1) A magneto-optical recording medium having a substrate and at least two magnetic layers (a recording layer and a supporting layer) laminated on top of the other, the recording layer permitting the retrieval of information by utilizing the fact that when it is irradiated with a laser beam it produces the magneto-optical effect which affects its reflected light, characterized in that the recording layer is thin enough for the laser beam to penetrate.

(2) A magneto-optical recording medium as defined in (1) above, wherein the recording layer has a thickness which is established such that there may be a difference smaller than 20% between the angles of rotation of the plane of polarization of the reflected light which vary depending on whether the supporting layer is magnetized upward or downward.

(3) A magneto-optical recording medium as defined in (1) above, wherein the recording layer has a thickness in the range of 10 nm to 50 nm.

(4) A magneto-optical recording medium as defined in any of (1) to (3) above, which has a first dielectric layer on the surface of the recording layer which is opposite to the surface in contact with the supporting layer, and also has a second dielectric layer on the surface of the supporting layer which is opposite to the surface in contact with the recording layer.

(5) A magneto-optical recording medium as defined in (4) above, which has a metal layer on the surface of the second dielectric layer which is opposite to the surface in contact with the supporting layer.

(6) A magneto-optical recording medium as defined in any of (1) to (5) above, wherein the recording layer and supporting layer have a total thickness in the range from 20 nm to 100 nm.

The first aspect of the present invention will be explained in detail in the following.

(1) According to the present invention, the recording layer 3 (shown in FIG. 1) is thin enough for the laser beam for information retrieval to penetrate. The thin recording layer produces a pronounced magneto-optical effect. Usually, a thin magnetic layer that permits the penetration of a laser beam has a low reflectivity or produces a reduced magneto-optical effect (Kerr rotation). Contrary to the ordinary experience, the recording layer 3 in the present invention causes multiple reflections in it, producing an increased magneto-optical effect, when it has a thickness in the range of 10 nm to 50 nm. This results from the fact that the light which has penetrated the recording layer 3 undergoes Faraday rotation.

A reduction in the thickness of the recording layer 3 leads to a reduction in the total thickness of the two magnetic layers. When irradiated with a laser beam, the thin magnetic layers generate more heat per unit volume than if they were thick. In other words, the thin magnetic layers only need a laser beam of lower intensity than the thick magnetic layers do if they are to be heated to the same temperature. This means that the thin magnetic layers have an improved sensitivity. For this reason, the magneto-optical recording medium of the present invention permits rewriting and overwriting with a laser beam of low intensity. Being thin, the two magnetic layers produce only a small diamagnetic field due to their magnetization. This permits the stable recording to be achieved with a small recording field.

Incidentally, it does not matter whether which of the recording layer and the supporting layer is adjacent to the substrate. If the recording layer is adjacent to the substrate, it should be irradiated with a laser beam for information retrieval through the substrate. If the supporting layer is adjacent to the substrate, the recording layer should be irradiated with a laser beam for information retrieval in the direction opposite to the substrate.

(2) According to the present invention, the two magnetic layers in total (i.e., the multilayer magnetic film) have a specific thickness as mentioned above. This offers an advantage that the output obtained by the read-out for verification which is performed immediately after overwriting coincides with that obtained by retrieval. In other words, the read-out for verification can be performed within one rotation of the recording medium (magnetic disk). This leads to the speedup of data processing.

According to the present invention, it is not always necessary that the angle of rotation of the plane of polarization of laser light remain the same regardless of whether the supporting layer 4 is magnetized upward or downward. On the contrary, a difference smaller than 20% is permissible. The reason for this is given below. A difference of 20% in the angle of rotation of the plane of polarization of laser light is equivalent to a difference of 2 dB in the C/N ratio. If the output from read-out for verification does not differ more than 2 dB from the output from retrieval, there would be only a very small difference between the result of read-out for verification and the result of actual retrieval. The difference would be on the order of $10^{-6}$ in terms of error rate. This value is permissible in practical use. Therefore, it is desirable that the thickness of the recording layer 3 be established such that the difference between the angles of rotation of the plane of polarization of laser light is smaller than 20%.

Moreover, for the high-density, high-performance recording, a provision should be made so that the difference is smaller than 5% between the angles of rotation of the plane of polarization of laser light which vary depending on whether the supporting layer is magnetized upward or downward. Under this condition, it is possible to produce the effect of the present invention even in the case of pit-edge recording system (which is designed to record information by means of recorded domains which differ in length). The pit-edge recording system increases the recording density by a factor of about 1.5 as compared with the conventional one. For example, in the case of pit-edge recording by 2-7 modulation method, the shortest bit length is about 0.4 times the diameter of light spot. In this situation, the jitter (standard deviation) allowable for recording at an error rate lower than $10^{-6}$ is one-eighth the bit length. This is because the unit length of the recorded domain for 2-7 modulation is one-half the bit length and the probability that a displacement four times the standard deviation will happen is $10^{-6}$. Therefore, the allowable jitter is about one-twentieth the light spot diameter. On the other hand, when the angle of rotation of the plane of polarization of laser light fluctuates as much as 5%, the position of the edge is displaced by about 5% (or 1/20) of the light spot diameter. This indicates that it is possible to ignore any fluctuation up to 5% that takes place in the angle of rotation of the plane of polarization of laser light.

(3) According to the present invention, the recording layer should have a thickness in the range of 10 nm to 50 nm. With a thickness smaller than 10 nm, the recording layer permits the laser light for information retrieval to pass through almost completely, with the result that the reflected light is affected only a little by the magneto-optical effect. On the other hand, with a thickness greater than 50 nm, the recording layer does not permit the laser light to pass through, with the result that the rotation of the plane of polarization due to Faraday effect does not take place in the recording layer.

The adequate thickness of the recording layer is in the range of 10 nm to 50 nm, which varies depending on the thickness of the supporting layer and the second dielectric layer. With this thickness, the reflected light is invariably affected by the magneto-optical effect irrespective of the direction of magnetization in the supporting layer.

The thickness of the recording layer is associated with the C/N ratio as shown in FIG. 11. It should be noted that the recording layer with a thickness in the range of 10 nm to 50 nm, preferably from 20 nm to 40 nm, gives rise to a high C/N ratio. With a thickness smaller than 20 nm, the recording layer permits the laser light for information retrieval to pass through in large part, with the result that the recording layer produces only a little magneto-optical effect. With a thickness greater than 40 nm, the recording layer does not permit the laser light for information retrieval to pass through easily, with the result that the supporting layer produces only a little magneto-optical effect.

(4) According to the present invention, the magneto-optical recording medium should have two magnetic layers which are sandwiched between two dielectric layers, as shown in FIG. 5. In other words, the magneto-optical recording medium should be constructed of a substrate, a first dielectric layer, a recording layer, a supporting layer, and a second dielectric layer laminated on top of the other. The layers may be arranged in the reverse order.

The first dielectric layer causes the laser light to reflect many times in it, thereby apparently enhances the magneto-optical effect (Kerr rotation) that is produced when reflection occurs at the interface between the dielectric layer and the recording layer. The second dielectric layer protects the recording layer and the supporting layer from corrosion such as oxidation.

When the recording layer 3 in the magneto-optical recording medium as shown in FIG. 5 is varied, the angle of Kerr rotation changes as shown in FIG. 6. It should be noted that when the recording layer 3 is 22 nm thick, the angle of Kerr rotation due to the upward magnetization in the supporting layer 4 coincides with the angle of Kerr rotation due to the downward magnetization in the supporting layer 4.

The desired thickness of the recording layer 3 is such that the angle of rotation of the plane of polarization of the laser light is approximately constant (within 20% of fluctuation) irrespective of the direction of magnetization in the supporting layer 4. Such a thickness is most desirable for the read-out for verification to be performed immediately after overwriting.

(5) According to the present invention, the second dielectric layer should preferably be coated with a layer of a metal having a high thermal conductivity. The metal layer prevents the part irradiated with a laser beam from getting hot and hence prevents the recording layer and supporting layer from degrading in magnetic characteristics after repeated rewriting.

In addition, the metal layer also functions as a reflecting layer which reflects the light which has passed through the recording layer and supporting layer. This permits an effective use of the magneto-optical effect (Faraday rotation) that shows when the light passes through the recording layer. Therefore, the metal layer improves the quality of signals and increases the number of times of repeated rewriting.

The magneto-optical recording medium shown in FIG. 1 (which has a metal layer 6 on the second dielectric layer 5) offers an advantage that it does not degrade in recording and reproducing characteristics after repeated rewriting and overwriting.

In the case of a conventional magneto-optical recording medium as shown FIG. 2, the heat generated by irradiation with a laser beam diffuses more into the recording layer 3 and supporting layer 4 in the direction parallel to the substrate than into the first dielectric layer 2 and second dielectric layer 5 in the direction perpendicular to the layer. The heat diffusion of this mode prevents the surrounding part of the light spot from getting hot easily and hence causes the central part of the light spot to get hot excessively, when a recorded domain is formed which has a diameter equal to half that of the light spot. This situation is depicted in FIG. 9. In this situation, the magneto-optical recording medium is liable to degrade in recording and reproducing characteristics after repeated rewriting and overwriting.

Unlike the conventional one, the magneto-optical recording medium of the present invention permits the heat generated by irradiation with a laser beam to diffuse in the recording layer 3 and supporting layer 4 in the direction perpendicular to the magnetic layers, reaching the metal layer. Since heat diffuses rapidly in the metal layer, temperature in the metal layer is lower and more uniformly distributed than in the magnetic layers. Moreover, since heat diffuses more rapidly with the increasing temperature difference, the most rapid heat diffusion takes place at the center of the laser spot where the temperature is highest in the magnetic layer due to irradiation with a laser beam. It follows, therefore, that the central part does not reach an extremely high temperature. This is depicted in FIG. 9. Owing to this feature, the magneto-optical recording medium of the present invention does not degrade in recording and reproducing characteristics even after repeated rewriting and overwriting.

The magneto-optical recording medium of the present invention is made up of a transparent substrate 1, a first dielectric layer 2, a recording layer 3, a supporting layer 4, a second dielectric layer 5, and a metal layer 6 arranged one over another, as shown in FIG. 1. This structure offers an advantage that the angle of Kerr rotation is increased by the multiple reflection of light in the first dielectric layer 2, the Faraday effect is enhanced in the recording layer 3 and supporting layer 4, and the angle of Kerr rotation is increased by the multiple reflection in the second dielectric layer 5. All this leads to the increased angle of rotation of the plane of polarization of the reflected light. Consequently, the magneto-optical recording medium has a high C/N ratio (carrier-to-noise ratio).

The magneto-optical recording medium as shown in FIG. 1 varies in the angle of Kerr rotation with the thickness of the recording layer 3. This is depicted in FIG. 3. One curve represents the angle of Kerr rotation which takes place when the supporting layer 4 is magnetized in the upward direction; and the other curve represents the angle of Kerr rotation which takes place when the supporting layer 4 is magnetized in the downward direction. With a thickness smaller than 10 nm, the recording layer 3 permits the light to pass through without substantial absorption and hence gives the angle of Kerr rotation which is determined only by the direction of magnetization in the supporting layer 4. Conversely, with a thickness greater than 50 nm, the recording layer 3 does not permit the light to pass through and hence gives the angle of Kerr rotation which is determined irrespective of the direction of magnetization in the supporting layer 4. In the case of this example, the recording layer 3 having a thickness of 20 nm gives the angle of Kerr rotation which is determined irrespective of the direction of magnetization in the supporting layer 4. This results from the multiple interference of light that takes place in the recording layer 3. This property can be utilized to produce a recording medium which permits the read-out for verification to be performed immediately after overwriting. In other words, the direction of magnetization in the supporting layer 4 varies depending on whether it is immediately after overwriting or at the time of retrieval, but the angle of Kerr rotation does not change; therefore, it is possible to perform read-out for verification immediately after overwriting.

In the case of this example, the optimum thickness of the recording layer 3 is 20 nm; in actual, however, it varies depending on the thickness and material of the supporting layer 4, the second dielectric layer 5, and the metal layer 6.

Under a certain condition, the recording layer 3 has a thickness at which the angle of rotation of the plane of polarization of a laser beam is approximately constant irrespective of the direction of magnetization in the supporting layer 4. It is in the range of 10 nm to 50 nm, depending on the supporting layer 4 and the second dielectric layer 5. FIG. 10 shows the dependence of the thickness of the recording layer 3 on the thickness of the second dielectric layer 5 and the thickness of the supporting layer 4.

(6) According to the present invention, the total thickness of the above-mentioned magnetic layer and supporting layer should preferably in the range of 20 nm to 100 nm. With a thickness smaller than 10 nm, the supporting layer is highly liable to oxidation and is difficult to make with a controlled thickness. Therefore, the total thickness of the recording layer and supporting layer should be larger than 20 nm.

If the total thickness of the recording layer and supporting layer is larger than 100 nm, the heat generated by irradiation with a laser beam diffuses more in the recording layer and supporting layer than in the first and second dielectric layers. The heat diffusion of this mode prevents the surrounding part of the light spot from getting hot easily and hence causes the central part of the light spot to get hot excessively, when a recorded domain is formed which has a diameter equal to half that of the light spot. In this situation, the magneto-optical recording medium is liable to degrade in recording and reproducing characteristics after repeated rewriting and overwriting. This is the reason why the total thickness of the recording layer and supporting layer should be smaller than 100 nm.

The second aspect of the present invention is achieved by a magneto-optical recording medium defined in the following.

(1) A magneto-optical recording medium composed of a substrate and at least one magnetic layer formed thereon, characterized in that the magnetic layer is composed of a recording layer, a first supporting layer, and a second supporting layer, having Curie temperatures of $T_1$, $T_2$, and $T_3$, respectively, which satisfy the following relationship.

$$T_1 < T_2 \text{ and } T_2 \geq T_3$$

(2) A magneto-optical recording medium as defined in (1) above, wherein the first supporting layer and second supporting layer have Curie temperatures of $T_2$ and $T_3$, respectively, which satisfy the following relationship.

$$T_2 > T_3$$

(3) A magneto-optical recording medium as defined in (1) or (2) above, wherein the recording layer, the first supporting layer, and the second supporting layer have Curie temperatures of $T_1$, $T_2$, and $T_3$, respectively, which satisfy the following relationship.

$$100° C. \leq T_1 \leq 250° C.,$$

$$150° C. \leq T_2 \leq 350° C., \text{ and}$$

$$100° C. \leq T_3 \leq 300° C.$$

(4) A magneto-optical recording medium as defined in any of (1) to (3) above, wherein the first and second supporting layers undergo magnetization reversal together at room temperature, and under such conditions the first and second supporting layers have a smaller coercive force than has the recording layer.

(5) A magneto-optical recording medium as defined in (4) above, wherein the second supporting layer continuously changes in composition across its thickness.

(6) A magneto-optical recording medium as defined in (4) above, wherein the second supporting layer is composed of a plurality of layers each having a different composition.

(7) A magneto-optical recording medium as defined in (4) above, wherein the second supporting layer has a smaller coercive force than has the first supporting layer.

(8) A magneto-optical recording medium composed of a substrate and at least one magnetic layer formed thereon, characterized in that the magnetic layer is composed of a recording layer, a first supporting layer, and a second supporting layer, having Curie temperatures of $T_1$, $T_2$, and $T_3$, respectively, which satisfy the following relationship.

$$T_1 < T_2$$

and $T_2$ is substantially equal to $T_3$, and the second supporting layer has a smaller coercive force than has the first supporting layer at a temperature in the neighborhood of the Curie temperature.

(9) A magneto-optical recording medium as defined in (8) above, wherein the first and second supporting layers undergo magnetization reversal together at room temperature, and under such conditions the first and second supporting layers have a smaller coercive force than has the recording layer.

The magneto-optical recording medium pertaining to the second aspect of the present invention has a multilayer magnetic film composed of three layers as shown in FIG. 13. Each of the three layers is designated as a recording layer 3 (adjacent to the substrate), a first supporting layer 4a, and a second supporting layer 4b. In addition, each of the three layers has a Curie temperature which satisfies the above-mentioned relationship.

According to the present invention, the recording layer should preferably have a Curie temperature $T_1$ in the range of 100° C. to 250° C. so that it gives the angle of Kerr rotation of certain magnitude. The first supporting layer should preferably have a Curie temperature $T_2$ in the range of 150° C. to 350° C., because $T_2$ should be higher than $T_1$. The second supporting layer should preferably have a Curie temperature $T_3$ in the range of 100° C. to 300° C., because $T_3$ should be lower than $T_2$. The Curie temperatures should preferably be in the range defined by 150° C.$\leq T_1 \leq$210° C., 200° C.$\leq T_2 \leq$300° C., and 150° C.$\leq T_3 \leq$250° C.

The recording layer should preferably have a thickness in the range of 100 Å to 800 Å. The first supporting layer should preferably have a thickness in the range of 400 Å to 1500 Å. The second supporting layer should preferably have a thickness in the range of 100 Å to 1000 Å.

The recording layer, the first supporting layer, and the second supporting layer are joined to each other by a magnetic bonding force, and the first and second supporting layers undergo magnetization reversal together at room temperature as shown in FIG. 14 (magnetization-field curve). Under such condition, the coercive force 25 should preferably be smaller than the coercive force 26 of the recording layer.

The recording layer should preferably be made of a material represented by the formula $(R_xT_{1-x})_{1-y}M_y$ (where R denotes a rare earth element, T denotes one or more elements selected from Fe, Co, and Ni, M denotes a transition metal, and x and y are defined by $0.1 \leq x \leq 0.4$ and $0 \leq Y \leq 0.2$. Examples of the material include Tb—Fe, Tb—Fe—Co, Tb—Dy—Fe—Co, and Gd—Tb—Fe with or without a small amount of at least one element selected from Cu, W, Ti, V, Cr, Sn, Pb, Mo, Nb, Pt, Pd, and Rh. The composition of the material should be selected such that the resulting recording layer gives a large angle of Kerr rotation (which is essential for information recording and retrieval). Preferred compositions to this end are Tb—Fe—Co, Gd—Tb—Fe, and Tb—Dy—Fe—Co.

The first supporting layer should preferably be made of a material which has a comparatively small coercive force at room temperature, because it has to undergo magnetization reversal easily by the initializing field. Preferred materials to meet this requirement are Td—Dy—Fe—Co, Gd—Dy—Fe—Co, and Gd—Tb—Fe each incorporated with a small amount of Sn and Pb. The second supporting layer should be made of a material having a composition represented by Tb—Fe—Co, Gd—Tb—Fe, Gd—Fe—Co, Tb—Dy—Fe—Co, and Gd—Dy—Fe—Co. It is desirable that both the first and second supporting layers be constructed of the same elements. For example, if the first supporting layer is made of Tb—Dy—Fe—Co, then the second supporting layer should also be made of Tb—Dy—Fe—Co, the latter having a lower Curie temperature than has the former. However, it is also possible that the first and second supporting layers are made of different elements. For example, the first supporting layer is made of Tb—Fe and the second supporting layer is made of Dy—Fe. Even in this case, the first and second supporting layers undergo magnetization reversal together at room temperature.

In addition, the second supporting layer may be constructed such that its composition changes continuously across its thickness. Also, the second supporting layer may be composed of a plurality of laminated films. In either cases, the second supporting layer should have a Curie temperature which is substantially equal to or lower than that of the first supporting layer.

The substrate for the magneto-optical recording medium is made of glass, polycarbonate, or polymethyl methacrylate. It is desirable that the magnetic layer of triple-layer structure be provided with a dielectric layer on one side or both sides thereof. The dielectric layer may be made of silicon nitride, aluminum nitride, silicon oxide, aluminum oxide, or the like.

The magneto-optical recording medium of the present invention performs information recording and retrieval in the following manner. When the recording layer is irradiated with a laser beam, the magnetic layer heats up, giving rise to a temperature distribution 27, with the recording layer being at a higher temperature and the second supporting layer being at a lower temperature, as shown in FIG. 15. If the laser beam is at a high-intensity level ($P_H$ level), the temperature distribution is such that the temperature in the recording layer is higher than the Curie temperature $T_1$ of the magnetic layer, the temperature in the first supporting layer is higher than the Curie temperature $T_2$ of the magnetic layer, and the temperature in the second supporting layer is higher than the Curie temperature $T_3$ of the magnetic layer. This temperature distribution brings about magnetization as follows even though the temperature of the second supporting layer is not so high. As the result of heating, the respective heated parts in the recording layer 3, the first supporting layer 4a, and the second supporting layer 4b lose magnetization 19, 29, and 30, as shown in FIG. 17. When the irradiation with a laser beam 20 (concentrated by the objective lens 21) comes to an end and the cooling process begins, the demagnetized parts become magnetized again in the direction of the recording magnetic field 13 applied by the recording magnet 22, as shown in FIG. 17b. Note that the direction of magnetization is opposite to that in the initial state. The same magnetization as above occurs even when the temperature distribution is $T_1 < T_3 < T_2$ instead of $T_3 < T_1 < T_2$ (shown in FIG. 15).

The description so far is about the recording achieved by irradiation at a high-intensity level ($p_H$ level). The same principle as above is applied to the initialization of the magnetic layer and the recording (to be more accurate, erasing) by irradiation at a low-intensity level ($P_L$ level). Prior to recording, the first and second supporting layers 4a and 4b are magnetized in the direction (29 and 30), which is parallel to the initializing magnetic field 17, by the initializing magnet 31, as shown in FIG. 16. The initializing magnetic field 17 should be stronger than the coercive force 25 of the first and second supporting layers but weaker than the coercive force 26 of the recording layer at room temperature, as shown in FIG. 8. Therefore, the recording layer remains magnetized in the same direction 19 even when it is subjected to the initializing magnetic field 17.

In the case of irradiation with a laser beam at a low-intensity level ($P_L$ level), the part irradiated with the laser beam 20 (as shown in FIG. 18(a)) heats up to a temperature close to the Curie temperature $T_1$ of the recording layer. In this heating step, the first and second supporting layers remain magnetized in the same direction as before, because their coercive force is greater than the recording magnetic field 13, as in the case of the conventional magneto-optical recording medium. When the magnetic layer cools after irradiation with a laser beam, the recording layer 3 is magnetized in the direction 19 opposite to that of the recording magnetic field 13 as shown in FIG. 13(b), because the magnetization 19 of the recording layer and the magnetization 29 of the first supporting layer have a greater exchange coupling force than has the recording magnetic field 13.

Incidentally, the magnitude of the exchange coupling force is expressed in terms of magnetic field $H_{exc}$ as follows:
Exchange coupling force acting on the recording layer . . .

$$H_{exc1} = \sigma w_1 / 2Ms_1 h_1$$

Exchange coupling force acting on the first supporting layer . . .

$$H_{exc21} = \sigma w_1 / 2Ms_2 h_2 \text{ (to the recording layer)}$$

$$H_{exc23} = \sigma w_2 / 2Ms_2 h_2 \text{ (to the second supporting layer)}$$

Exchange coupling force acting on the second supporting layer . . .

$$H_{exc3} = \sigma w_2 / 2Ms_3 h_3$$

where $Ms_1$, $Ms_2$, and $Ms_3$ represent the saturation magnetization of the respective magnetic layers; $h_1$, $h_2$, and $h_3$ represent the thickness of the respective magnetic layers; and σw₁ and σw₂ represent the magnetic wall energy at the interface between the recording layer and the first supporting layer and between the first supporting layer and the second supporting layer.

Thus, the magnitude of the exchange coupling force is controlled if the magnetic wall energy aw is controlled or the saturation magnetization Ms and the thickness h of the recording layer and the first and second supporting layers are controlled. The control of magnetic wall energy may be accomplished by holding the layers in an argon atmosphere containing nitrogen for a certain period of time (to lower the magnetic wall energy) or by subjecting the layer surface to sputter etching (to increase the magnetic wall energy). The control of saturation magnetization may be accomplished by adding V, Cr, Mn, Cu, Sn, or Sb in very small quantities.

Even in the case where the first and second supporting layers are made of materials having an identical Curie temperature, the same effect as mentioned may be produced if a provision is made so that the first supporting layer exceeds the second supporting layer in coercive force in the neighborhood of Curie temperature.

The third aspect of the present invention is achieved by a magneto-optical recording medium defined in the following.

(1) A magneto-optical recording medium capable of overwriting which is composed of a substrate and at least one magnetic layer formed thereon, characterized in that the magnetic layer is composed of a recording layer and a supporting layer, and the recording layer has a higher Curie temperature than has the supporting layer.

This structure causes the recording layer 3 to give a large angle of Kerr rotation, so that the magneto-optical recording medium produces improved outputs at the time of information retrieval and hence performs good recording and reproduction.

(2) A magneto-optical recording medium as defined in (1) above, in which the recording layer has a greater coercive force than has the supporting layer at room temperature.

This provision makes it possible to align the direction of magnetization of the supporting layer by the application of the initializing magnetic field with an adequate magnitude.

(3) A magneto-optical recording medium as defined in (1) above, in which the supporting layer 4 is magnetized in the upward direction or downward direction prior to the overwriting of information.

This provision makes overwriting possible because the supporting layer 4 has renewed magnetization information independently of the direction of the previously recorded magnetization.

(4) A magneto-optical recording medium as defined in (3) above, in which the recording layer 3 is magnetized in the direction parallel or opposite to the direction in which the supporting layer 4 has been magnetized prior to the overwriting of information, when the magneto-optical recording medium is irradiated with a laser beam of low intensity so that a strong exchange coupling is established between the magnetization of the recording layer 3 and the magnetization of the supporting layer 4.

This provision makes it possible to align the magnetization of the recording layer 3 in one direction, thereby to erase information, independently of the previously recorded information, when the magneto-optical recording medium is irradiated with a laser beam of low intensity.

(5) A magneto-optical recording medium as defined in (4) above, in which, upon irradiation with a laser beam of high intensity, the recording layer 3 is magnetized in the direction parallel or opposite to the direction of the externally applied recording magnetic field and also opposite to the direction in which the recording layer 3 is magnetized when the magneto-optical recording medium is irradiated with a laser beam of low intensity.

This provision makes it possible to perform recording simply by setting the direction of the recording magnetic field in either upward or downward.

(6) A magneto-optical recording medium as defined in (1) above, in which information retrieval is performed by utilizing the magneto-optical effect which changes the polarization of the reflected light of a laser beam when the recording layer 3 is irradiated with a laser beam.

The magneto-optical effect denotes Kerr effect or Faraday effect. The magneto-optical effect is more pronounced in proportion to the Curie temperature ($T_{c1}$) of the recording layer 3. A good magneto-optical effect is produced in the case of (1) above. The result is an increased signal output and an improved signal quality.

(7) A magneto-optical recording medium as defined in (1) above, in which, upon irradiation with a laser beam of low intensity, the recording layer 3 and supporting layer 4 heat up merely to a temperature lower than the Curie temperature ($T_{c1}$) of the recording layer ($T_{c1}$) and the Curie temperature ($T_{c2}$) of the supporting layer 4.

This provision produces the following effect. When the magneto-optical recording medium is irradiated with a laser beam of low intensity, the supporting layer 4 does not heat up beyond its Curie temperature ($T_{c2}$); therefore, the supporting layer 4 remains magnetized in the direction parallel to the direction in which the supporting layer 4 has been magnetized prior to the overwriting of information. Thus the direction of magnetization of the recording layer 3, which is aligned by the strong exchange coupling between the magnetization of the recording layer 3 and the magnetization of the supporting layer 4, is aligned in the direction parallel or opposite to the direction of magnetization of the supporting layer 4 which has been aligned in one direction (upward or downward) prior to the overwriting of information. Therefore, upon irradiation with a laser beam of low intensity, the recording layer 3 is magnetized in either upward or downward independently of information previously recorded in the recording layer 3.

(8) A magneto-optical recording medium as defined in (1) above, in which, upon irradiation with a laser beam of high intensity, the recording layer 3 and supporting layer 4 heat up to a temperature higher than the Curie temperature ($T_{c2}$) of the supporting layer 4. This provision causes the supporting layer 4 to heat up to a temperature higher than its Curie temperature ($T_{c2}$) upon irradiation with a laser beam of high intensity. Therefore, the supporting layer 4 is demagnetized and the recording layer 3 alone is influenced by the recording magnetic field. This makes it possible to direct the magnetization of the recording layer 3 either upward or downward independently of the previous magnetization, by irradiation with a laser beam of high intensity.

The magneto-optical recording medium constructed as mentioned above is capable of overwriting if the recording magnetic field is previously set up in such a direction that, upon irradiation with a laser beam of high intensity, the recording layer 3 is magnetized in the direction opposite to the direction in which the recording layer 3 is magnetized upon irradiation with a laser beam of high intensity.

(9) A magneto-optical recording medium as defined in (3) above, in which, when the recording layer 3 and supporting layer 4 cool down after irradiation with a laser beam of high intensity, the supporting layer 4 is magnetized, through the exchange coupling with the recording layer 3, in the direction parallel or opposite to the direction of magnetization of the recording layer 1 or in the direction opposite to the direction of magnetization of the supporting layer 4 which is established prior to the overwriting of information.

This provision produces the following effect. Although the magnetic layer 3 is magnetized in the direction under the influence of the recording magnetic field upon irradiation with a laser beam of high intensity, it remains magnetized in the direction opposite to that in which the recording layer 3 is magnetized upon irradiation with a laser beam of low intensity, even when the recording layer 3 and supporting layer 4 cool down to the temperature which the recording layer 3 and supporting layer 4 reach upon irradiation with a laser beam of low intensity.

This makes it possible to magnetize the recording layer 3 either upward or downward by irradiation with a laser beam of high intensity, independently of the direction of previous magnetization of the recording layer 3. In this way, the magneto-optical recording medium permits overwriting.

The magneto-optical recording medium pertaining to the present invention offers the following advantages. The magneto-optical recording medium is composed of a substrate and a recording layer 3 and a supporting layer 4 laminated on said substrate. The recording layer 3 has a high coercive force ($H_{c1}$) at room temperature, and the supporting layer 4 has a relatively low coercive force ($H_{c2}$) at room temperature. They are in magnetic exchange coupling with each other. Prior to information recording, the supporting layer 4 is previously magnetized in one direction only (upward or downward). When the recording layer is irradiated with a low-intensity laser beam ($P_L$), while a recording magnetic field ($H_W$) is being applied upward or downward with respect to the magneto-optical recording medium, upwardly or downwardly magnetized marks are formed in the recording layer. When the recording layer is irradiated with a high-intensity laser beam ($P_H$), oppositely magnetized marks are formed in the recording layer. In this way, the overwriting of information is performed. To retrieve the overwritten information, the recording layer 3 is irradiated with a laser beam. The reflected light of the laser beam undergoes polarization due to the magneto-optical effect produced by the magnetization of the recording layer 3. This polarization is utilized for information retrieval. What is important in the present invention is that the Curie temperature ($T_{c1}$) of the magnetic layer 3 is higher than the Curie temperature ($T_{c2}$) of the supporting layer 4. This permits the recording layer 3 to have a high Curie temperature. Since the angle of Kerr rotation increases in proportion to the Curie temperature, the recording layer produces an increased signal output (in terms of the angel of rotation of the plane of polarization of the reflected light). Thus, the present invention provides a magneto-optical recording system and a magneto-optical recording medium capable of overwriting with a high C/N ratio as shown in FIG. 22.

According to the present invention, the magnetic exchange coupling at room temperature ($T_R$) is comparatively weak to such an extent that the recording layer 3 and supporting layer 4 are magnetized independently of each other. However, the magnetic exchange coupling at a temperature ($T_L$) to which the recording layer 3 and supporting layer 4 are heated upon irradiation with a low-intensity laser light ($P_L$), becomes strong to such an extent that the recording layer 3 is magnetized in the direction parallel to that in which the supporting layer 4 is magnetized. Moreover, upon irradiation with a low-intensity laser light ($P_L$), the magnetic layer 3 and supporting layer 4 heat up to a temperature ($T_H$) which is higher than the Curie temperature of the supporting layer 4. This provision causes the supporting layer 4 to be magnetized in one direction only when the magneto-optical recording medium is subjected to the initializing magnetic field ($H_{INI}$) with an adequate magnitude at room temperature.

In addition, upon irradiation with a low-intensity laser light ($P_L$), the recording layer 3 is magnetized in the direction parallel or opposite to that in which the supporting layer 4 is magnetized. Moreover, upon irradiation with a high-intensity laser light ($P_H$), the recording layer 3 is magnetized in the direction parallel to that of the recording magnetic field ($H_W$), because the supporting layer 4 is already demagnetized on account of its higher temperature ($T_H$) than the Curie temperature ($T_{c2}$). Therefore, if the recording magnetic field is arranged in the direction opposite to that in which the magnetic layer 3 is magnetized upon irradiation with a high-intensity laser light ($P_L$), upwardly or downwardly magnetized marks are formed in the recording layer upon irradiation with a high-intensity laser light ($P_H$), and oppositely magnetized marks are formed upon irradiation with a low-intensity laser light ($P_L$). In this way, the overwriting of information is performed.

The present invention provides a magneto-optical recording medium capable of overwriting which comprises a substrate and a magnetic layer formed thereon which is composed of at least a recording layer and a supporting layer. This magneto-optical recording medium presents the following features.

(1) The recording layer is thin enough for the laser light to pass through, so that the magneto-optical recording medium is capable of rewriting and over-writing at a high sensitivity with a laser beam of low intensity. This is because the reduction in the overall thickness of the magnetic layer increases the amount of heat given by the laser light per unit volume of the magnetic layer.

The magneto-optical recording medium has a high C/N ratio because it gives a large angle of rotation of the plane of polarization of the reflected light. The improvement in C/N ratio over the conventional magneto-optical recording medium is shown in FIGS. 7 and 11. In addition, the magneto-optical recording medium permits overwriting immediately after the read-out for verification. This greatly increases the data processing speed.

In addition, owing to the additional metal layer, the magneto-optical recording medium keeps its reliable recording and reproducing characteristics without degradation even after repeated rewriting and over-writing, as shown in FIG. 7.

(2) The supporting layer is divided into two layers; that is, the magneto-optical recording medium of the invention has a recording layer, a first supporting layer, and a second supporting layer. The three layers have their respective Curie temperatures of $T_1$, $T_2$, and $T_3$ which satisfy the following relationship.

$$T_1 < T_2 \text{ and } T_2 \geq T_3$$

Owing to this structure, the magneto-optical recording medium is capable of recording and erasing with a laser beam of lower intensity than the conventional one requires. This permits the magneto-optical recording medium of the present invention to perform recording at a linear speed of 44 m/sec. (In the case of conventional one, the maximum linear speed was limited to 20 m/sec on account of the maximum output of the semiconductor laser.) This linear speed is equal to that which is produced at the outermost tack when a 9.5-inch magneto-optical recording medium is rotated at 3600 rpm. Such a large magneto-optical recording medium can store a large quantity of information such as fast-moving animation images. According to the present invention, there is a magnetic coupling force between the recording layer and the first supporting layer and also between the first supporting layer and the second supporting layer. Moreover, the first and second supporting layers undergo magnetization reversal all together at room temperature, and their coercive force after magnetization reversal is smaller than that of the recording layer. This provision permits the magneto-optical recording medium to perform overwriting by the modulation of light intensity.

In the case where the second supporting layer has a smaller coercive force and a larger saturation magnetization than has the first supporting layer, the first and second supporting layers have a coercive force which is smaller that they would have when they are present individually. This produces an effect of reducing the initializing magnetic field. Even in the case where the first and second supporting layers are made of materials having the same Curie temperature, they produce an effect of increasing the recording sensitivity, if a provision is made so that the second supporting layer has a smaller coercive force than has the first supporting layer in the neighborhood of the Curie temperature. For a sufficient sensitivity, it is desirable that the difference between the Curie temperature ($T_2$) of the first supporting layer and the Curie temperature ($T_3$) of the second supporting layer be greater than 3° C., preferably greater than 5° C.

(3) According to the present invention, the recording layer has a higher Curie temperature than has the supporting layer. This produces a large angle of Kerr rotation without lowering the recording sensitivity, and hence leads to a magneto-optical recording medium capable of overwriting with a high C/N ratio. This is because the recording layer 3 (from which information is retrieved) has a high Curie temperature, and in general, the higher the Curie temperature, the greater the angle of Kerr rotation.

BRIEF DESCRIPTION OF THE DRAWINGS

FIG. 21 is a diagram showing the characteristic properties of the recording layer and supporting layer used in the megneto-optical recording medium pertaining to the present invention.

DESCRIPTION OF THE PREFERRED EMBODIMENTS

EXAMPLE 1-1

Figure 1:
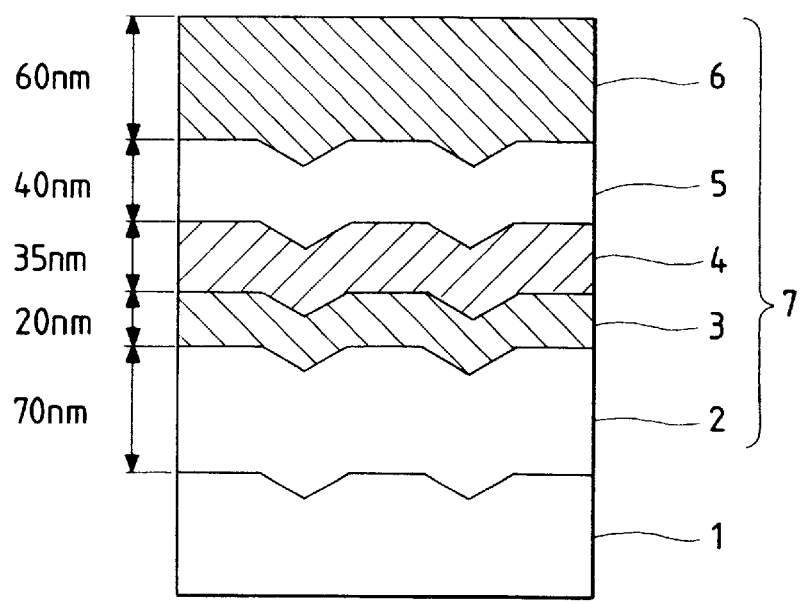
FIGS. 1 and 5 are partially sectional views showing the magneto-optical recording medium pertaining to the present invention.
Figure 2:
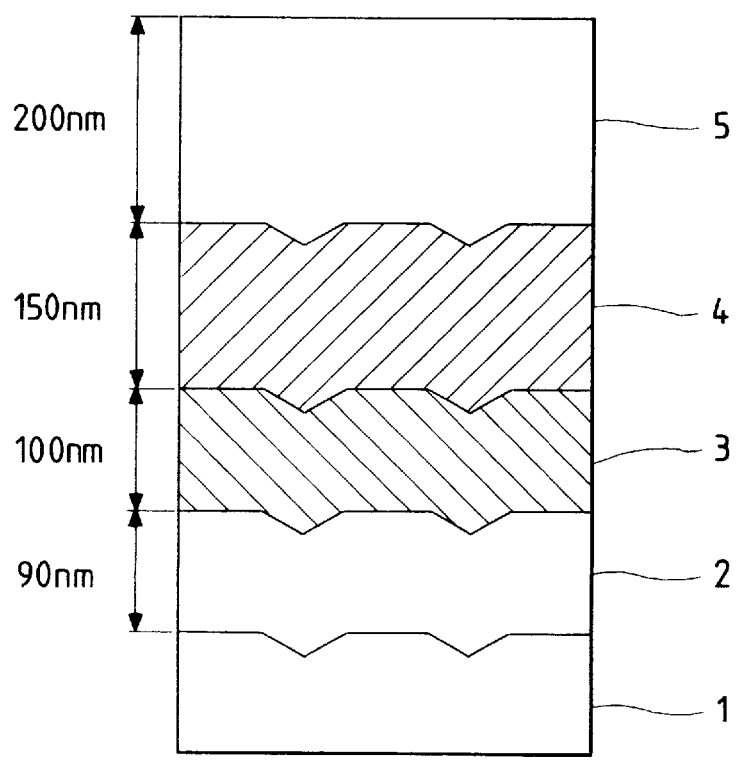
FIG. 2 is a partially sectional view showing a conventional magneto-optical recording medium.

The magneto-optical recording medium produced in this example is shown in partial section in FIG. 1. It was produced in the following manner. First, a transparent glass substrate 1 (5.25 inches in diameter) with tracking guide grooves was placed in a radio-frequency magnetron sputtering apparatus. After evacuation below 0.1 mPa, the sputtering apparatus was filled with a thin mixture gas of argon and nitrogen. Reactive sputtering was performed at a pressure of 1.3 Pa using an Si target. Thus there was formed a 70-nm thick $SiN_x$ film as the first dielectric layer 2. Sputtering was performed in argon at a pressure of 0.7 Pa using a TbFeCo alloy target. Thus there was formed a 20-nm thick amorphous alloy film of TbFeCo as the recording layer 3. Sputtering was performed in argon at a pressure of 0.7 Pa using a TbDyFeCo alloy target. Thus there was formed a 35-nm thick amorphous alloy film of TbDyFeCo as the supporting layer 4. (The thus formed recording layer 3 and supporting layer 4 are in magnetic exchange coupling with each other.) The sputtering apparatus was evacuated again below 0.1 mPa and then filled with a thin mixture gas of argon and nitrogen. Reactive sputtering was performed at a pressure of 1.3 Pa using an Si target. Thus there was formed a 40-nm thick $SiN_x$ film as the second dielectric layer 5. Sputtering was performed in argon at a pressure of 0.7 Pa using an AlTi alloy target. Thus there was formed a 60-nm thick film of $AlTi_x$ as the metal layer 6.

The magneto-optical recording medium produced in this example is capable of overwriting with a single beam. In other words, the recording layer 3 has a lower Curie temperature than has the supporting layer 4, and the supporting layer 4 has a lower coercive force than has the recording layer 3 at room temperature. Therefore, the supporting layer 4 alone can be magnetized in one direction if the initializing magnetic field is applied by a permanent magnet at room temperature. When a recording medium like this is irradiated with a laser beam having a comparatively low intensity, the recording layer 3 heats up beyond its Curie temperature, with the result that the recording layer 3 is magnetized in the same direction as the supporting layer 4 is magnetized. On the other hand, when it is irradiated with a laser beam having a comparatively high intensity, the supporting layer 4 heats up beyond its Curie temperature, with the result that the supporting layer 4 is magnetized in the direction parallel to the direction of the magnetic field externally applied by a permanent magnet. In the cooling course, the direction of magnetization of the recording layer 3 is aligned with that of the supporting layer 4. This is the reason why the magneto-optical recording medium is capable of overwriting with a single beam by the modulation of laser light intensity.

Figure 3:
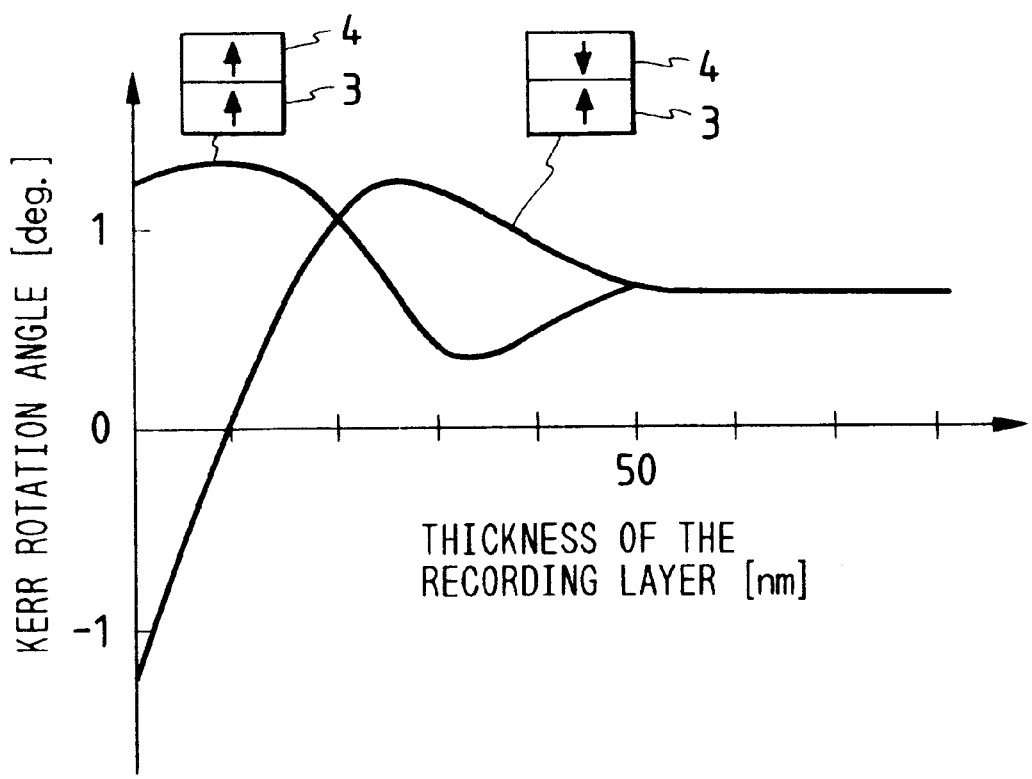
FIGS. 3, 6, and 10 are diagrams illustrating the principle on which the present invention is based.

The magneto-optical recording medium produced in the manner mentioned above changes in the angle of Kerr rotation according as the recording layer 3 changes in thickness, as shown in FIG. 3. (The two curves correspond to the upward and downward direction in which the supporting layer 4 is magnetized.) With a thickness less than 10 nm, the recording layer 3 permits the light to pass through with very little absorption and shows the angle of Kerr rotation which is determined only by the direction in which the supporting layer 4 is magnetized. Conversely, with a thickness in excess of 50 nm, the recording layer 3 permits the light to pass through very little and shows the angle of Kerr rotation which does not depend on the direction of magnetization of the supporting layer 4. Also, with a thickness of 20 nm, the recording layer 3 shows the angle of Kerr rotation which does not depend on the direction in which the supporting layer 4 is magnetized. This results from the effect of multiple interference of light that takes place in the recording layer 3.

In this Example, the recording layer 3 has a thickness of 20 nm. It permits the read-out for verification to be performed immediately after overwriting, because the direction in which the supporting layer 4 is magnetized varies depending on whether magnetization takes place immediately after overwriting or at the time of information retrieval, but the angle of Kerr rotation remains unchanged. A detailed description about this is given below.

Figure 4:
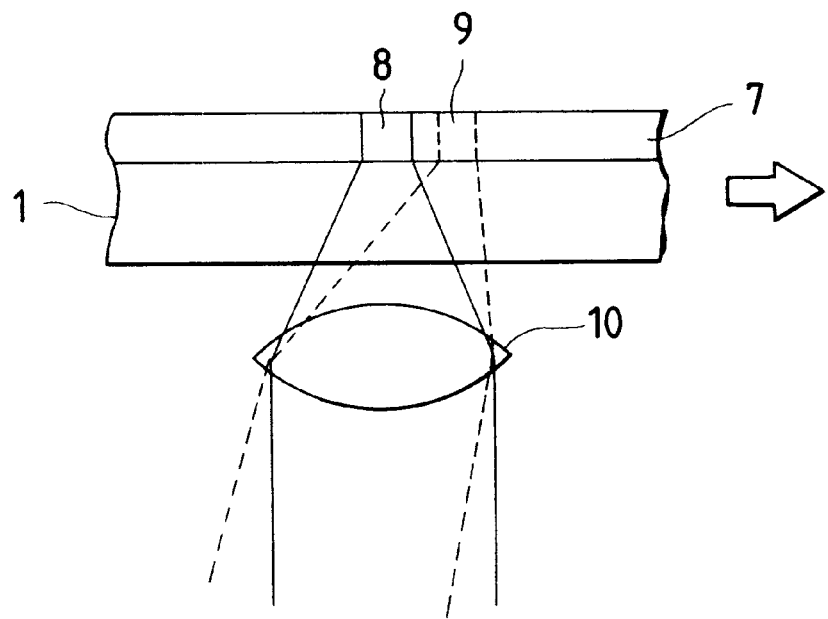
FIG. 4 is a schematic diagram illustrating the principle on which the read-out for verification is performed by two beams.

Assuming that the optical head is arranged as shown in FIG. 4, a light spot 8 for recording and a light spot 9 for read-after-write are focused by the lens 10 on the recording medium 7 produced as mentioned above. The two light spots are 40 μm apart. The light spot 8 for recording performs overwriting, and the light spot 9 for read-after-write reads the overwritten information for verification. This system permits high-speed data processing because the overwriting and read-out for verification (which comprise the recording operation) can be performed while the recording medium makes one turn. The magneto-optical recording medium (disk) in this Example achieves data transfer at a rate of 1.8 MB/s when it turns at 2400 rpm. For recording, it merely needs a laser beam having a power less than 10 mW. In addition, it has high reliability, with the error rate in read-out for verification being lower than $10^{-6}$.

Figure 7:
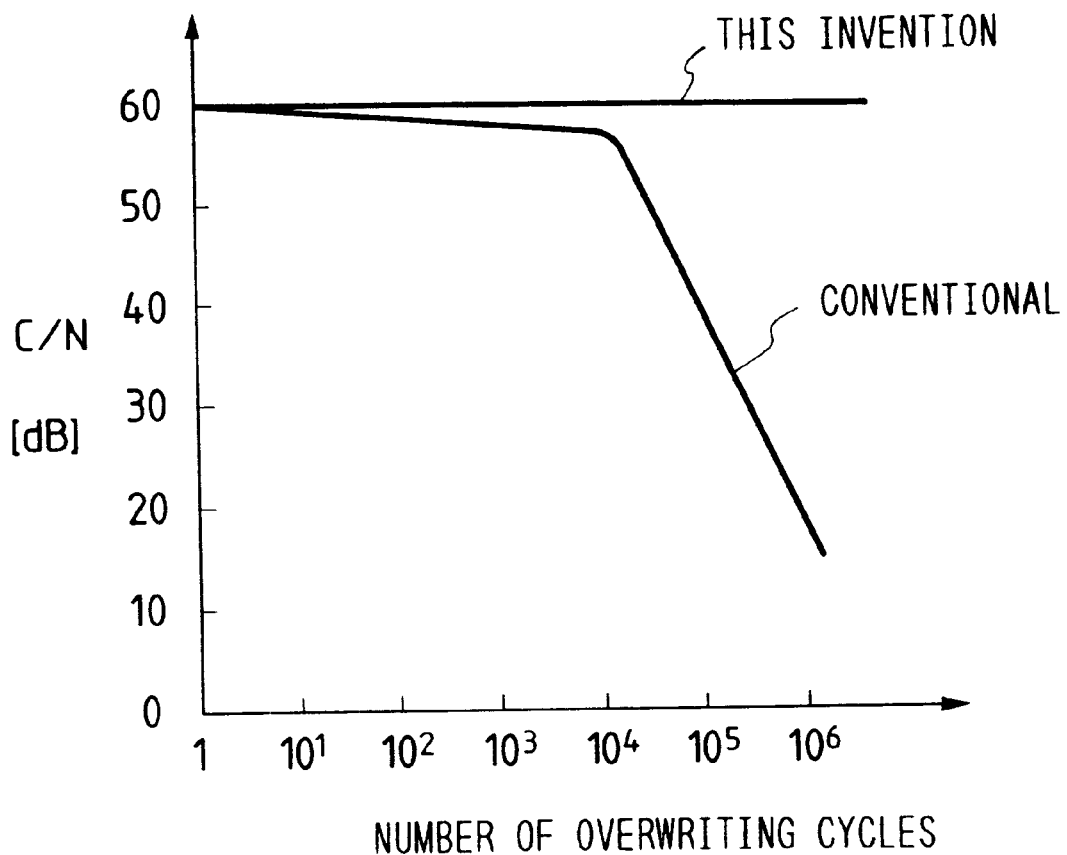
FIGS. 7 and 11 are diagrams illustrating the effect of the present invention.
Figure 9:
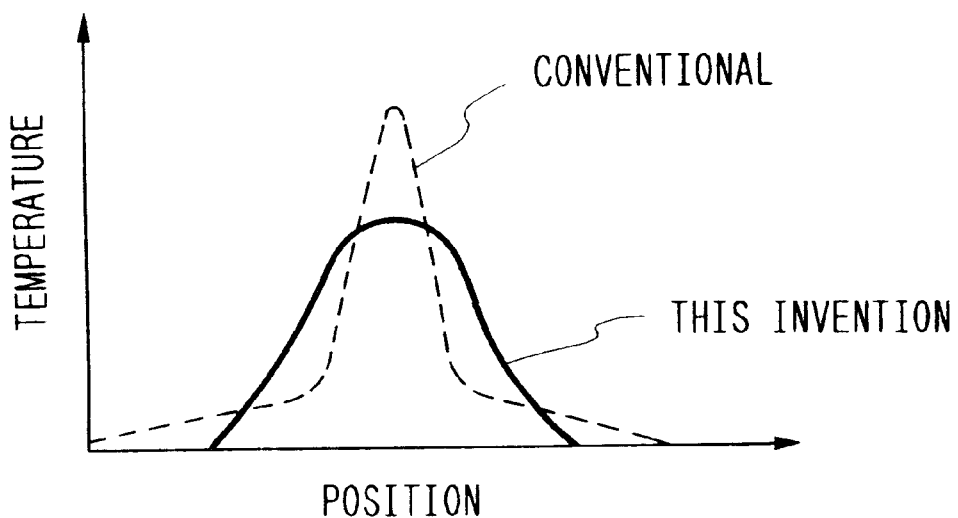
FIG. 9 is a diagram showing the temperature distribution in the recording layers, one pertaining to the conventional technology, the other pertaining to the present invention.
Figure 8A:
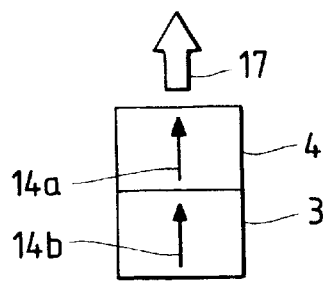
FIGS. 8(a)–8(g) are diagrams illustrating the principle of overwriting.
Figure 8B:
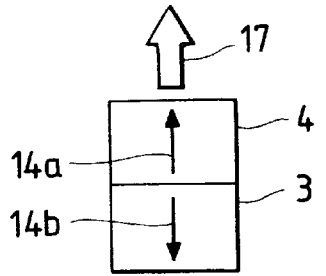
Figure 8C:
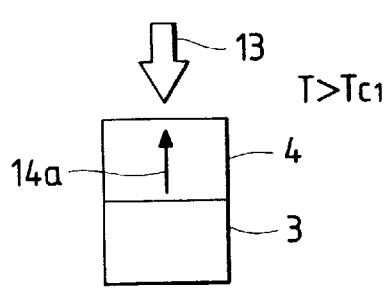
Figure 8D:
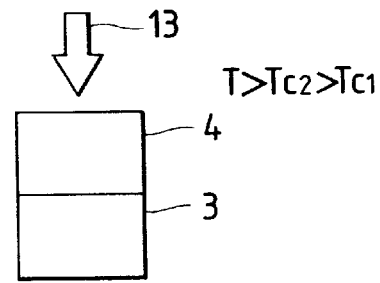
Figure 8E:
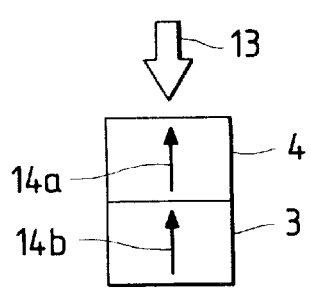
Figure 8F:
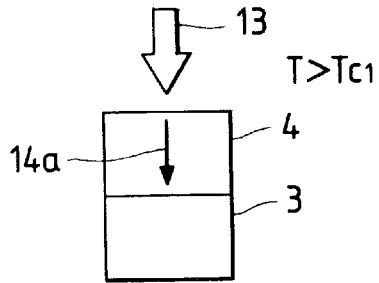
Figure 8G:
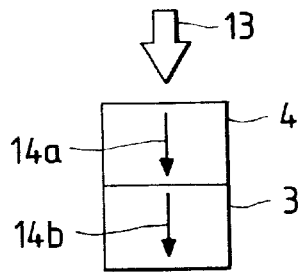
Figure 10:
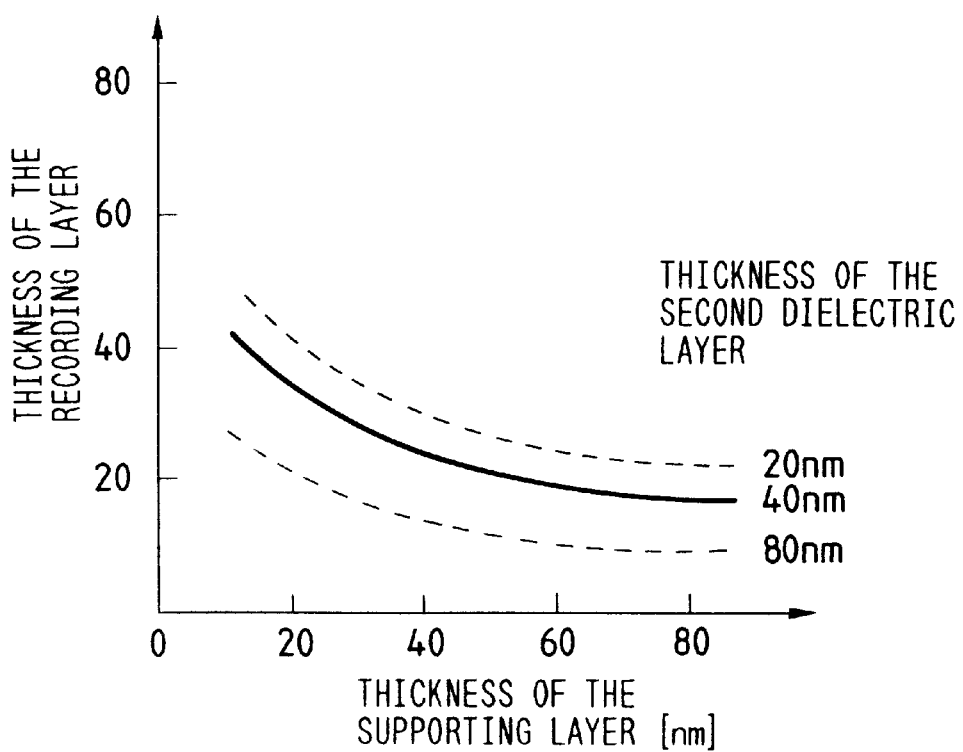
Figure 11:
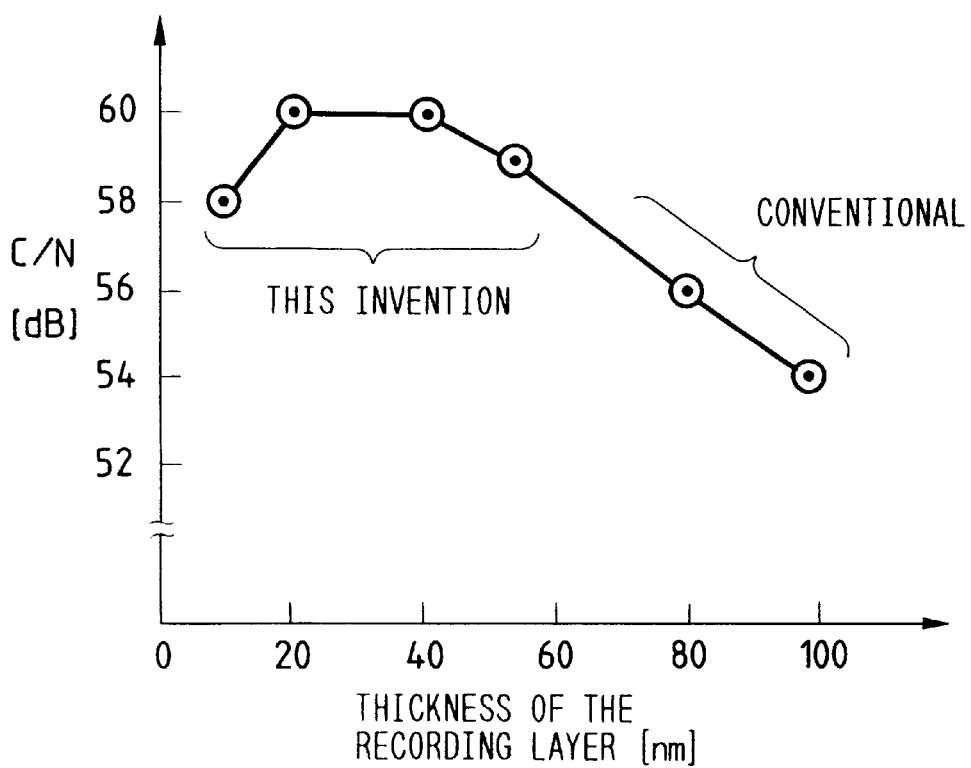

Moreover, the magneto-optical recording medium in this Example gives a high C/N ratio. It retained its high C/N ratio even after repeated overwriting, as shown in FIG. 7. It is noted that the conventional recording medium decreases in C/N ratio after overwriting more than $10^4$ times, whereas the recording medium in this Example remains unchanged in C/N ratio even after repeated over-writing as many times as $10^6$.

EXAMPLES 1-2 TO 1-4

Magneto-optical recording media were prepared in the same manner as in Example 1-1, except that a change was made in the thickness of the recording layer 3 and supporting layer 4 as shown in Table 1. They are capable of read-out for verification immediately after overwriting. They permit data transfer at a rate of 1.8 MB/s when they are turned at 2400 rpm. For recording, they merely need a laser beam with a power of less than 10 mW. They has high reliability, with the error rate in read-out for verification being lower than $10^{-6}$. In addition, they have a high C/N ratio as that in Example 1-1, and they retained their high C/N ratio even after repeated overwriting as many times as $10^6$.

TABLE 1

| Example No. | 1-2 | 1-3 | 1-4 |
| --- | --- | --- | --- |
| Recording layer 3 | 35 nm | 30 nm | 25 nm |
| Supporting layer 4 | 20 nm | 30 nm | 45 nm |

EXAMPLE 1-5

Figure 5:
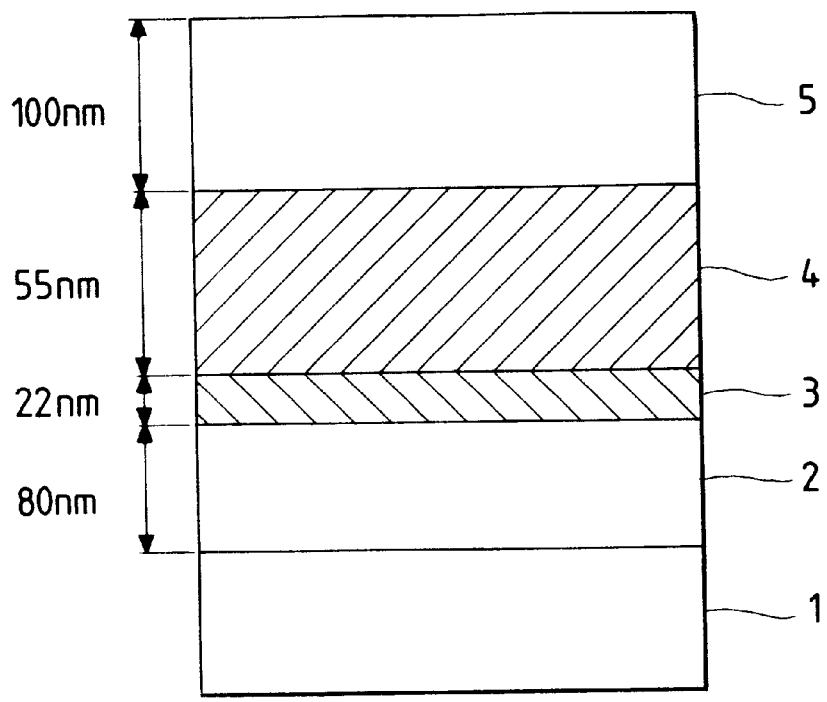

A magneto-optical recording medium, whose partially sectional view is shown in FIG. 5, was produced in the following manner. First, a transparent glass substrate 1 (5.25 inches in diameter) with tracking guide grooves was placed in a radio-frequency magnetron sputtering apparatus. After evacuation below 0.1 mPa, the sputtering apparatus was filled with a thin mixture gas of argon and nitrogen. Reactive sputtering was performed at a pressure of 1.3 Pa using an Si target. Thus there was formed an 80-nm thick $SiN_x$ film as the first dielectric layer 2. Sputtering was performed in argon at a pressure of 0.7 Pa using a TbFeCo alloy target. Thus there was formed a 22-nm thick amorphous alloy film of TbFeCo as the recording layer 3. Sputtering was performed in argon at a pressure of 0.7 Pa using a TbDyFeCo alloy target. Thus there was formed a 55-nm thick amorphous alloy film of TbDyFeCo as the supporting layer 4. (The thus formed recording layer 3 and supporting layer 4 are in magnetic exchange coupling with each other.) The sputtering apparatus was evacuated again below 0.1 mPa and then filled with a thin mixture gas of argon and nitrogen. Reactive sputtering was performed at a pressure of 1.3 Pa using an Si target. Thus there was formed a 100-nm thick $SiN_x$ film as the second dielectric layer 5.

The magneto-optical recording medium produced in this Example is capable of overwriting with a single beam, like the one produced in Example 1.

Figure 6:
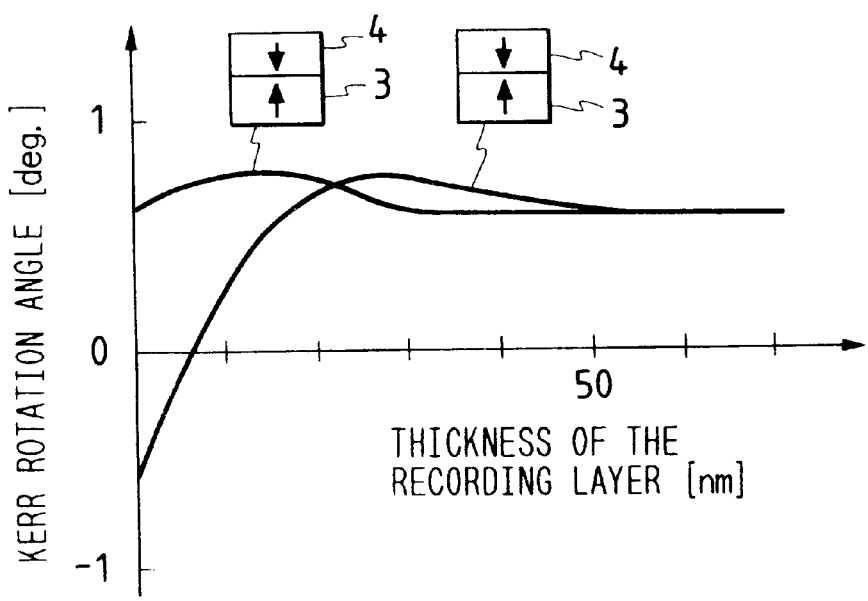

The magneto-optical recording medium produced in this Example changes in the angle of Kerr rotation according as the recording layer 3 changes in thickness, as shown in FIG. 6. (The two curves correspond to the upward and downward direction in which the supporting layer 4 is magnetized.) With a thickness less than 10 nm, the recording layer 3 permits the light to pass through with very little absorption and shows the angle of Kerr rotation which is determined only by the direction of magnetization of the supporting layer 4. Conversely, with a thickness in excess of 50 nm, the recording layer 3 permits the light to pass through very little and shows the angle of Kerr rotation which does not depend on the direction in which the supporting layer 4 is magnetized. Also, with a thickness of 22 nm, the recording layer 3 shows the angle of Kerr rotation which does not depend on the direction in which the supporting layer 4 is magnetized. This results from the effect of multiple interference of light that takes place in the recording layer 3.

In this Example, the recording layer 3 has a thickness of 22 nm. It permits the read-out for verification to be performed immediately after overwriting. This system permits high-speed data processing because the overwriting and read-out for verification (which comprise the recording operation) can be performed while the recording medium makes one turn. The magneto-optical recording medium (disk) in this Example achieves data transfer at a rate of 1.8 MB/s when it turns at 2400 rpm. For recording, it merely needs a laser beam having a power less than 10 mW. In addition, it has high reliability, with the error rate in read-out for verification being lower than $10^{-6}$, and it has a high C/N ratio.

Moreover, the magneto-optical recording medium in this Example gives a high C/N ratio. It retained its high C/N ratio even after repeated overwriting, as shown in FIG. 7. It is noted that the conventional recording medium decreases in C/N ratio after overwriting more than $10^4$ times, whereas the recording medium in this Example remains unchanged in C/N ratio even after repeated over-writing as many times as $10^6$.

EXAMPLE 2-1

Figure 12:
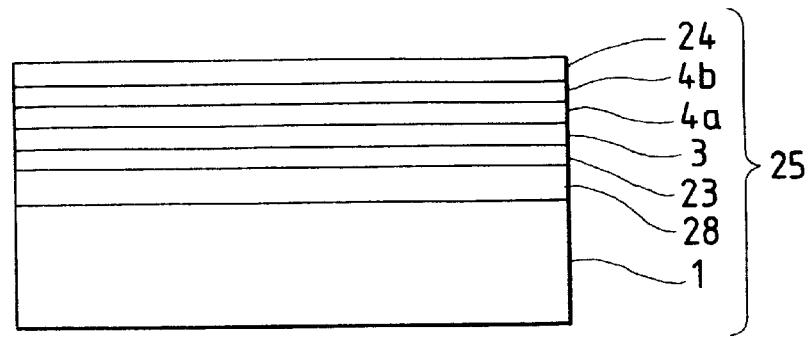
FIG. 12 is a schematic sectional diagram showing the structure of the magneto-optical recording medium in one embodiment of the present invention.
Figure 13:
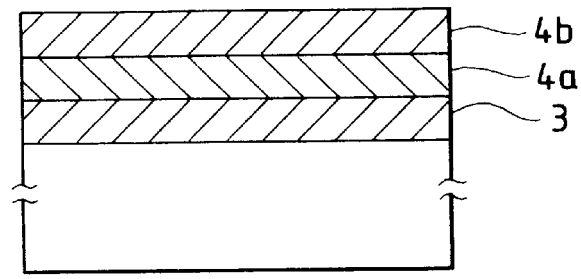
FIG. 13 is a schematic diagram illustrating the principle of the magneto-optical recording medium pertaining to the present invention.
Figure 14:
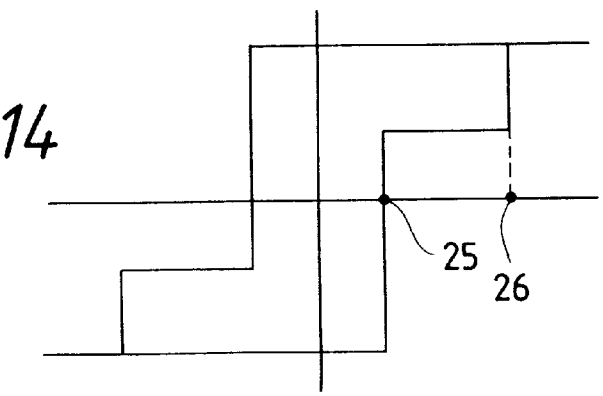
FIGS. 14 and 15 are schematic diagrams showing the characteristics of the magneto-optical recording medium pertaining to the present invention.
Figure 15:
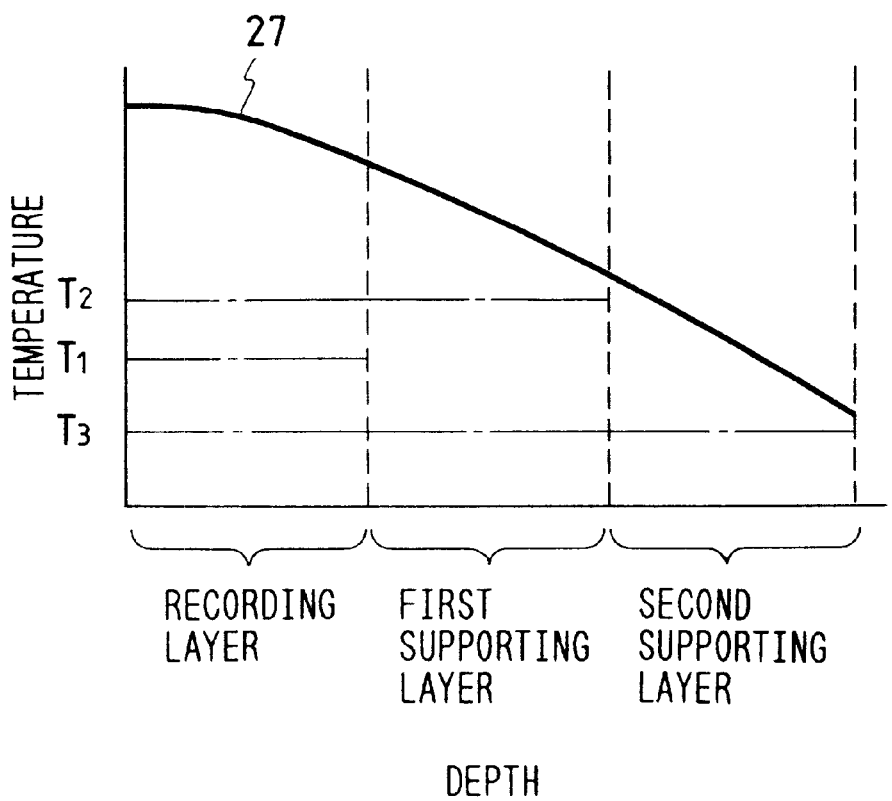
Figure 16:
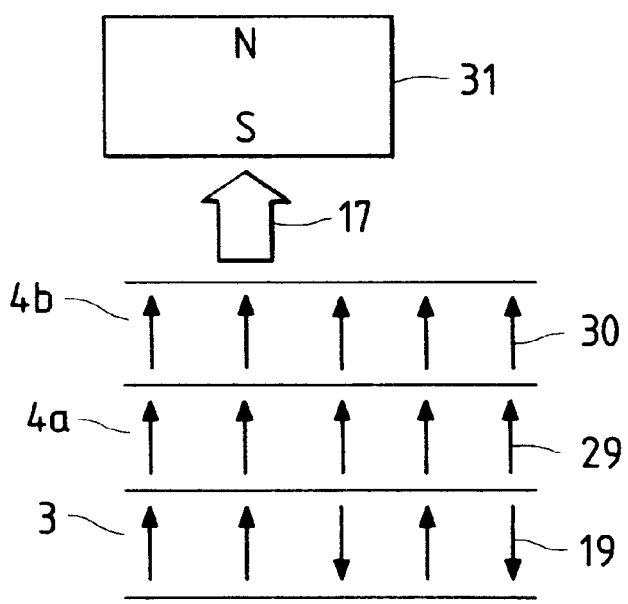
FIGS. 16, 17(a), 17(b), 18(a) and 18(b) are schematic diagrams illustrating the principle of the light intensity modulation applied to the magneto-optical recording medium pertaining to the present invention.
Figures 17A, 17B:
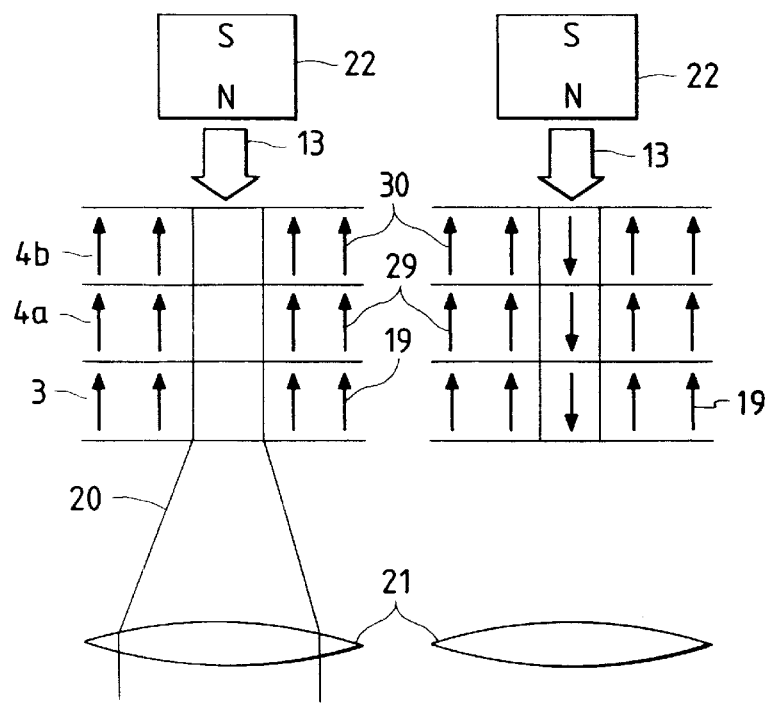
Figures 18A, 18B:
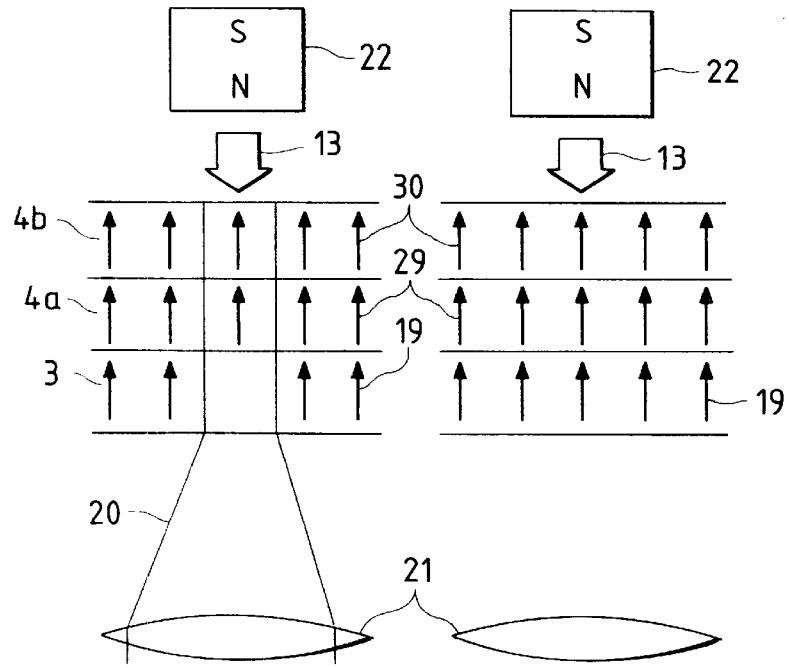

A magneto-optical recording medium, whose partially sectional view is shown in FIG. 12, was prepared in the following manner. A discoid glass substrate 1, which is coated with a 30-μm thick UV light-cured resin layer 28 having grooves formed at a pitch of 1.6 μm, was provided with film layers by sputtering. First, a silicon nitride film (850 Å thick) was formed using a silicon target and a thin mixture gas (sputtering gas) composed of argon and nitrogen at a pressure of $1\times10^{-2}$ Torr. The resulting silicon nitride has a controlled refractive index according to the mixing ratio of argon and nitrogen. In this Example, the mixture gas contains 10% nitrogen so that the resulting silicon nitrogen has a refractive index of 2.0. Subsequently, three layers were formed one after another. That is, a 400 Å thick $Tb_{20}Fe_{72}Co_8$ film having a Curie temperature $T_1$ of 170° C. was formed as the recording layer 3; a 1000 Å thick $Tb_{17}Dy_{16}Fe_{50}Co_{17}$ film having a Curie temperature $T_2$ of 250° C. was formed as the first supporting layer 4a; and a 500 Å thick $Tb_{15}Dy_{20}Fe_{55}Co_{10}$ film having a Curie temperature $T_3$ of 200° C. was formed as the second supporting layer 4b. For these layers, sputtering was performed using a composite target composed of an iron plate and chips of Tb, Dy, and Co placed thereon. (The composite target may be replaced by an alloy target.) Finally, the top layer was coated with a silicon nitride film 24 (1000 Å thick) for protection of the magnetic layers 3, 4a, and 4b against corrosion (oxidation).

The magneto-optical recording medium 25 produced as mentioned above was tested for recording performance by the application of laser light. The results are shown in Table 2.

In a Comparative Example, a magneto-optical recording medium was prepared which has a 1500 Å thick $Tb_{17}Dy_{16}Fe_{50}Co_{17}$ film having a Curie temperature of 250° C. (as the supporting layer) on the recording layer. Both of the magneto-optical recording media produced in Example 2-1 and Comparative Example have a 1900 Å thick magnetic layer; however, they differ from each other in the minimum power of laser light required for recording and the C/N ratio at the time of signal reproduction. The former needs laser light of 8 mW for the recording of 1 MHz signals (50% duty) at a linear speed of 11 m/s and has a C/N ratio of 55 dB for the reproduction of signals recorded with 13 mW laser light. By contrast, the latter needs 10 mW laser light and has a C/N ratio of 55 dB. Thus, the magneto-optical recording medium in this Example is more sensitive by 2 mW (in terms of recording power) than that in Comparative Example. The high sensitivity permits a larger recording domain (mark) to be formed with the same recording power (13 mW) and hence leads to an improved C/N ratio.

TABLE 2

| | Total thickness of magnetic layers | Minimum recording power | C/N ratio |
|---|---|---|---|
| Example 2–1 | 1900 Å | 8 mW | 55 dB |
| Comparative Example | 1900 Å | 10 mW | 55 dB |

EXAMPLES 2-2 TO 2-6

Magneto-optical recording media were prepared in the same manner as in Example 2-1, except that the recording layer and the first and second supporting layers were formed from the materials shown in Table 3. (For instance, in Example 2-2, the recording layer is a $Tb_{23}Fe_{68}Co_9$ film (having a Curie temperature ($T_1$) of 200° C. and a thickness ($h_1$) of 500 Å), the first supporting layer is a $Gd_{24}Fe_{68}Co_8$ film (having a Curie temperature ($T_2$) of 300° C. and a thickness ($h_2$) of 500 Å), and the second supporting layer is a $Gd_{10}Tb_{12}Fe_{74}Co_4$ film (having a Curie temperature ($T_3$) of 170° C. and a thickness ($h_3$) of 500 Å). In Example 2-2, both the recording layer and the first supporting layer have a high Curie temperature, so that the magneto-optical recording medium has stable overwriting characteristics irrespective of the fluctuation of ambient temperature. In Example 2-3, the recording layer is made of $Gd_{10}Tb_9Fe71$, which gives a large angle of Kerr rotation, so that the magneto-optical recording medium has improved reproducing performance. In Example 2-4, the recording layer contains Nb, so that the magnetic layer has good corrosion resistance. Incidentally, Nb may be replaced by Cr.

The magneto-optical recording medium may be modified in its structure. For instance, the first and second supporting layers may be replaced by a single magnetic layer in which the composition changes continuously across its thickness. In Example 2-5, the recording layer is a $Tb_{19}Fe_{70}Co_8Cr_3$ film (having a Curie temperature ($T_1$) of 190° C. and a thickness ($h_1$) of 300 Å), the first supporting layer (close to the recording layer) is a $Tb_{24}Fe_{64}Co_{12}$ film (having a Curie temperature ($T_2$) of 220° C.), and the second supporting layer (far from the recording layer) is a $Tb_{22}Dy_2Fe_{66}Co_{10}$ film (having a Curie temperature ($T_3$) of 200° C.). (In other words, there is the composition gradient in the first and second supporting layers.) The total thickness of the first and second supporting layers is 1100 Å. In Example 2-6, the recording layer is a $TblGy_8Fe_{78}Co_6$ film (having a Curie temperature ($T_1$) of 210° C. and a thickness ($h_1$) of 200 Å), the first supporting layer is a $Tb_{17}Fe_{60}Co_{19}Cu_4$ film (having a Curie temperature ($T_2$) of 260° C. and a thickness ($h_2$) of 500 Å), and the second supporting layer is composed of two films, one being a $Tb_{17}Fe_{69}Co_{15}$ film (having a Curie temperature ($T_3$) of 250° C. and a thickness $h_3$ of 300 Å), the other being a $Tb_{17}Fe_{68}Co_{14}$ film (having a Curie temperature ($T_4$) of 230° C. and a thickness $h_3$ of 300 Å). In Example 2-5, the composition gradient was formed such that the concentration of Dy gradually increases and the concentration of Co decreases across the thickness from the substrate to the top layer. The composition gradient produces the effect of lowering the initializing magnetic field. In Example 2-6, it is possible to make recording with a lesser power of laser light.

TABLE 3

| Example No. | Recording layer | 1st supporting layer | 2nd supporting layer |
|---|---|---|---|
| Example 2-2 | $Tb_{23}Fe_{68}Co_9$<br>$T_1 = 200°$ C.<br>$h_1 = 500$ Å | $Gd_{24}Fe_{68}Co_8$<br>$T_2 = 300°$ C.<br>$h_2 = 500$ Å | $Gd_{10}Tb_{12}Fe_{74}Co_4$<br>$T_3 = 170°$ C.<br>$h_3 = 500$ Å |
| Example 2-3 | $Gd_{10}Tb_{19}Fe_{71}$<br>$T_1 = 150°$ C.<br>$h_1 = 600$ Å | $Gd_{10}Dy_8Fe_{74}Co_8$<br>$T_2 = 200°$ C.<br>$h_2 = 1000$ Å | $Gd_8Dy_8Fe_{81}Co_2$<br>$T_3 = 150°$ C.<br>$h_3 = 500$ Å |
| Example 2-4 | $Tb_{27}Fe_{81}Co_{10}Nb_2$<br>$T_1 = 180°$ C.<br>$h_1 = 400$ Å | $Tb_{18}Dy_{17}Fe_{40}Co_{25}$<br>$T_2 = 250°$ C.<br>$h_2 = 600$ Å | $Tb_{18}Dy_{16}Fe_{46}Co_{20}$<br>$T_3 = 200°$ C.<br>$h_3 = 600$ Å |
| Example 2-5 | $Tb_{19}Fe_{70}Co_8Cr_3$<br>$T_1 = 190°$ C.<br>$h_1 = 300$ Å | $Tb_{24}Fe_{64}Co_{12} \ldots$<br>$T_2 = 220°$ C.<br>$h_2 + h_3 = 1100$ Å | $Tb_{22}Dy_2Fe_{66}Co_{10}$<br>$T_3 = 200°$ C. |
| Example 2-6 | $Tb_{10}Dy_8Fe_{76}Co_6$<br>$T_1 = 210°$ C.<br>$h_1 = 200$ Å | $Tb_{17}Fe_{60}Co_{19}Cu_4$<br>$T_2 = 260°$ C.<br>$h_2 = 500$ Å | $Tb_{17}Fe_{68}Co_{15}$<br>$T_3 = 250°$ C.<br>$h_3 = 300$ Å<br>$Tb_{17}Fe_{68}Co_{14}$<br>$T_4 = 230°$ C.<br>$h_4 = 300$ Å |

EXAMPLE 2-7

A magneto-optical recording medium was prepared in the same manner as in Example 2-1, except that the recording layer is a $Tb_{18}Fe_{74}Co_8$ film (having a Curie temperature ($T_1$) of 190° C., a thickness ($h_1$) of 400 Å, and a coercive force ($H_c$) of 15 kOe measured for the single layer), the first supporting layer is a $Tb_{18}Dy_{17}Fe_{37}Co_{28}$ film (having a Curie temperature ($T_2$) of 290° C., a thickness ($h_2$) of 400 Å, and a coercive force ($H_c$) of 4 kOe measured for the single layer), and the second supporting layer is a $Tb_{20}Dy_{17}Fe_{43}Co_{20}$ film (having a Curie temperature ($T_3$) of 250° C., a thickness ($h_3$) of 600 Å, and a coercive force (He) of 2 kOe measured for the single layer). The first and second supporting layers as a whole (1000 Å thick) has a coercive force ($H_c$) of 1 kOe, whereas the first supporting layer (1000 Å thick) formed alone on the recording layer has a coercive force ($H_c$) of 3 kOe. The fact that the second supporting layer has a lower coercive force than has the first supporting layer contributes to the great reduction of the initializing magnetic field.

EXAMPLE 3-1

Figure 19:
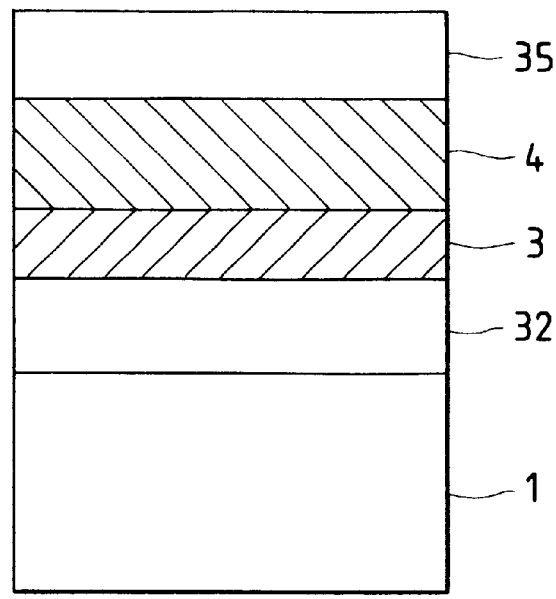
FIGS. 19, 20(a) and 20(b) are sectional views showing the structure of the magneto-optical recording medium pertaining to the present invention.

A magneto-optical recording medium, which has a laminated structure as shown in FIG. 19, was prepared in the following manner. First, a transparent glass substrate 1 (5.25 inches in diameter) with tracking guide grooves was placed in a radio-frequency magnetron sputtering apparatus. After evacuation below 0.1 mPa, the sputtering apparatus was filled with a thin mixture gas of argon and nitrogen. Reactive sputtering was performed at a pressure of 1.3 Pa using an Si target. Thus there was formed a 70-nm thick $SiN_x$ film as the dielectric layer 32. Sputtering was performed in argon at a pressure of 0.7 Pa using a TbFeCo alloy target. Thus there was formed a 50-nm thick amorphous alloy film of $Tb_{21}Fe_{61}Co_{18}$ (rich in transition metal) as the recording layer 3. Sputtering was performed in argon at a pressure of 0.7 Pa using a TbDyFeCo alloy target. Thus there was formed a 100-nm thick amorphous alloy film of $Tb16Dy_{16}Fe_{60}Co8$ (rich in rare earths) as the supporting layer 4. (The thus formed recording layer 3 and supporting layer 4 are in magnetic exchange coupling with each other.) The sputtering apparatus was evacuated again below 0.1 mPa and then filled with a thin mixture gas of argon and nitrogen. Reactive sputtering was performed at a pressure of 1.3 Pa using an Si target. Thus there was formed a 100-nm thick $SiN_x$ film as the protective layer 35.

The magneto-optical recording medium in this example is characterized by that the recording layer 3 has a Curie temperature ($T_{c1}$) of 300° C. and the supporting layer 4 has a Curie temperature ($T_{c2}$) of 250° C., and that the recording layer 3 has a coercive force of 10 kOe and the supporting layer 4 has a coercive force of 3 kOe at room temperature. (See FIG. 20(a).) The exchange coupling force between the two layers is not so great. In this example, the recording layer 3 and supporting layer 4 are amorphous alloy films (rare earth elements and transition metals), and consequently each layer is magnetized in a direction which is determined by the moment of rare earth elements or the moment of transition metals, whichever great. The amorphous alloy film in which the moment of rare earth elements is great is referred to as "rare earth-rich one", and the amorphous alloy film in which the moment of transition metals is great is referred to as "transition metal-rich one". In general, the rare earth-rich one changes into the transition metal-rich one at high temperatures.

The mechanism of overwriting will be explained with reference to FIG. 21. The supporting layer 4 alone can be magnetized in one direction upon application of the initializing magnetic field ($H_{INI}$) 17 by a permanent magnet at room temperature, as shown in FIGS. 21(a) and (b). The supporting layer 4, which is rich in rare earth elements, is magnetized in the direction opposite to that of the transition metal moment 36, at room temperature. However, the transition metal moment 36 in the recording layer 3 is aligned with the transition metal moment in the supporting layer 4 due to exchange coupling, at a temperature (TL) which is reached when the recording medium is irradiated with a laser beam ($P_L$) of comparatively low intensity. (See FIG. 21(d).) When the recording medium is irradiated with a laser beam ($P_H$) of comparatively high intensity, the supporting layer 4 heats up to a temperature ($T_H$) which is higher than the Curie temperature ($T_{c2}$). Therefore, the direction of magnetization (the direction of transition metal moment) of the recording layer 3 is parallel to that of the recording magnetic field 13 (the magnetic field externally applied by a permanent magnet). (See FIG. 21(f).) In the subsequent cooling step, the direction of magnetization (the direction of transition metal moment) of the supporting layer 4 becomes parallel to the direction of magnetization (the direction of transition metal moment) of the recording layer 3. (See FIG. 21(e).) As cooling proceeds to a temperature which is reached when the recording medium is irradiated with a laser beam ($P_L$) of comparatively low intensity, the direction of magnetization remains unchanged. (See FIG. 21(c).) In this manner, overwriting can be performed with a single laser beam by modulating the intensity of laser light.

Figure 22:
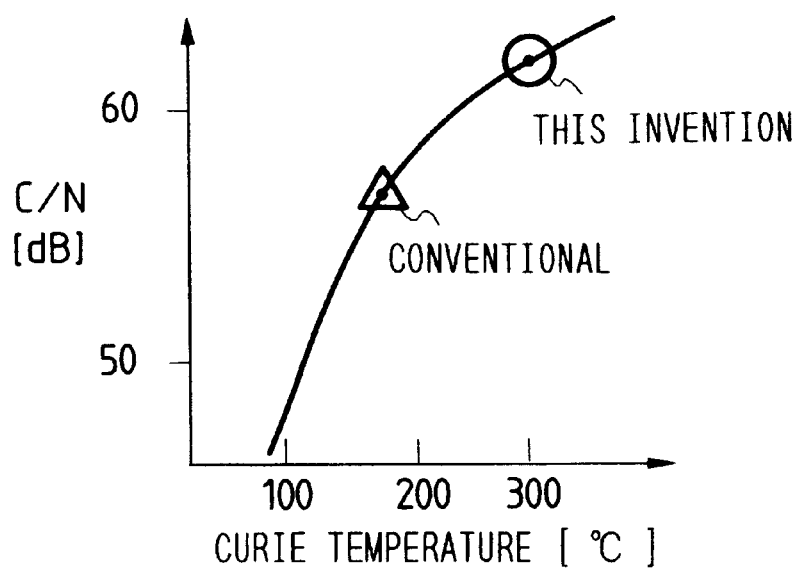
FIGS. 22 and 23 are diagrams illustrating the principle of the present invention.

The magneto-optical recording medium in this example was examined for recording-reproducing characteristics. The C/N ratio for a recording mark length of 5 pm is 62 dB, as shown in FIG. 22. A laser power of about 14 mW is required for recording in the outermost track (5 inches in diameter) running at 3600 rpm.

EXAMPLE 3-2

A magneto-optical recording medium, which has a laminated structure as shown in FIG. 19, was prepared in the following manner. First, a transparent glass substrate 1 (5.25 inches in diameter) with tracking guide grooves was placed in a radio-frequency magnetron sputtering apparatus. After evacuation below 0.1 mPa, the sputtering apparatus was filled with a thin mixture gas of argon and nitrogen. Reactive sputtering was performed at a pressure of 1.3 Pa using an Si target. Thus there was formed a 80-nm thick $SiN_x$ film as the dielectric layer 32. Sputtering was performed in argon at a pressure of 0.7 Pa using a TbFeCo alloy target. Thus there was formed a 22-nm thick amorphous alloy film of $Tb_{28}Fe_{52}Co_{20}$ as the recording layer 3. Sputtering was performed in argon at a pressure of 0.7 Pa using a TbDy-FeCo alloy target. Thus there was formed a 55-nm thick amorphous alloy film of $Tb_{17}Dy_{15}Fe_{60}Co_8$ as the supporting layer 4. (The thus formed recording layer 3 and supporting layer 4 are in magnetic exchange coupling with each other.) The sputtering apparatus was evacuated again below 0.1 mPa and then filled with a thin mixture gas of argon and nitrogen. Reactive sputtering was performed at a pressure of 1.3 Pa using an Si target. Thus there was formed a 100-nm thick $SiN_x$ film as the protective layer 35.

The magneto-optical recording medium in this example is characterized by that the recording layer 3 has a Curie temperature ($T_{c1}$) of 300° C. and the supporting layer 4 has a Curie temperature ($T_{c2}$) of 250° C., and that the recording layer 3 has a coercive force of 8 koe and the supporting layer 4 has a coercive force of 3 kOe at room temperature. (See FIG. 20(b).) The exchange coupling force between the two layers is not so great. The magneto-optical recording medium is also capable of overwriting as that in Example 3-1.

The magneto-optical recording medium in this Example has a C/N ratio of about 60 dB, which is inferior to that in Example 3-1. Nevertheless, this C/N ratio is still higher than that (57 dB) of the conventional magneto-optical recording medium capable of overwriting. This improvement results from the fact that the recording layer has a higher Curie temperature. Moreover, it needs a laser power of only 8 mW for recording in the outermost track (5 inches in diameter) running at 3600 rpm. This improvement is due to the reduction in the total thickness of the recording layer.

EXAMPLE 3-3

Figure 23:
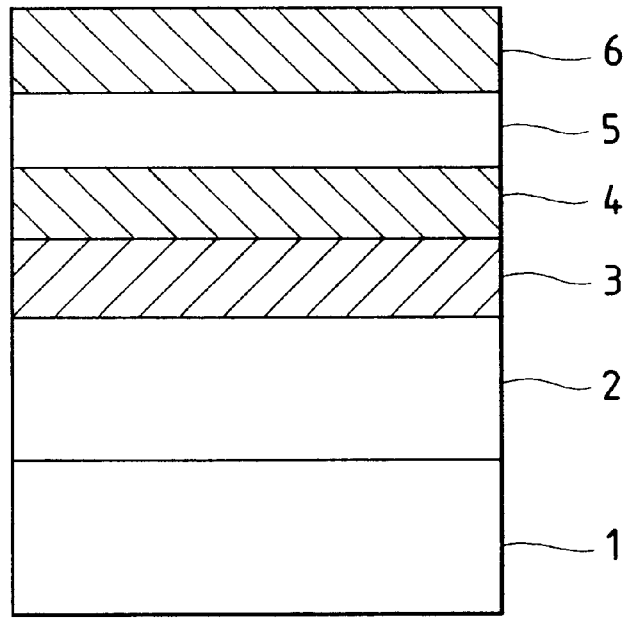

A magneto-optical recording medium, which has a laminated structure as shown in FIG. 23, was prepared in the following manner. First, a transparent glass substrate 1 (5.25 inches in diameter) with tracking guide grooves was placed in a radio-frequency magnetron sputtering apparatus. After evacuation below 0.1 mPa, the sputtering apparatus was filled with a thin mixture gas of argon and nitrogen. Reactive sputtering was performed at a pressure of 1.3 Pa using an Si target. Thus there was formed a 70-nm thick $SiN_x$ film as the dielectric layer 32. Sputtering was performed in argon at a pressure of 0.7 Pa using a TbFeCo alloy target. Thus there was formed a 20-nm thick amorphous alloy film of $Tb_{22}Fe_{56}Co_{22}$ as the recording layer 3. Sputtering was performed in argon at a pressure of 0.7 Pa using a TbDy-FeCo alloy target. Thus there was formed a 35-nm thick amorphous alloy film of $Tb_{20}Dy_{12}Fe_{58}Co_{10}$ as the supporting layer 4. (The thus formed recording layer 3 and supporting layer 4 are in magnetic exchange coupling with each other.) The sputtering apparatus was evacuated again below 0.1 mPa and then filled with a thin mixture gas of argon and nitrogen. Reactive sputtering was performed at a pressure of 1.3 Pa using an Si target. Thus there was formed a 40-nm thick $SiN_x$ film as the protective layer 35. Sputtering was performed in argon at a pressure of 0.7 Pa using an AlTi alloy target. Thus there was formed a 60-nm thick film of AlTi, as the metal layer 6. (This metal layer 6 functions as a reflective layer which increases the angle of Kerr rotation by optical interference and also functions as a heat-diffusing layer which protects the recording film against an extremely high temperature, thereby increasing the number of rewriting cycles available.

Figure 20A:
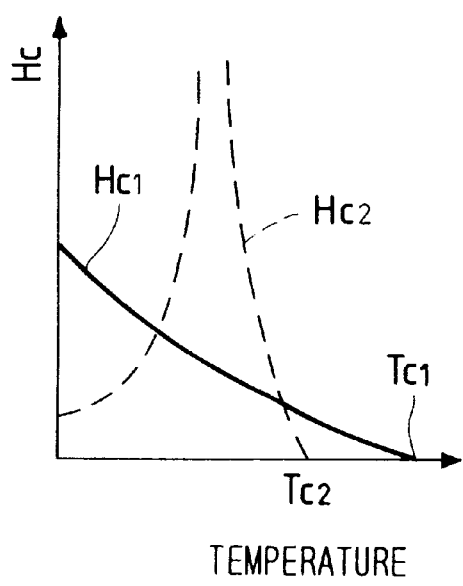
Figure 20B:
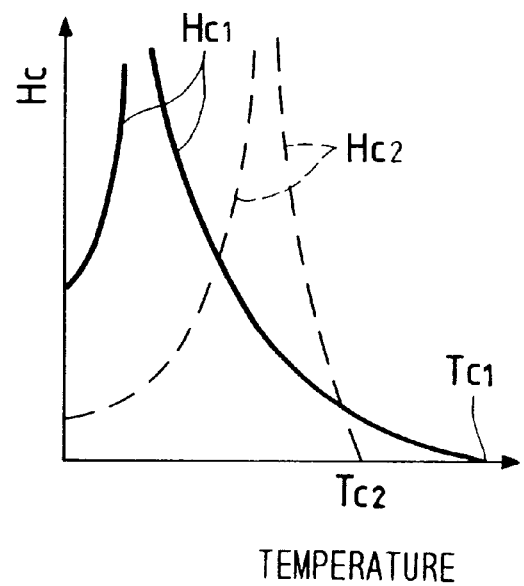

The magneto-optical recording medium in this example is characterized by that the recording layer 3 has a Curie temperature ($T_{c1}$) of 320° C. and the supporting layer 4 has a Curie temperature ($T_{c2}$) of 270° C., and that the recording layer 3 has a coercive force of 12 kOe and the supporting layer 4 has a coercive force of 4 kOe at room temperature. Moreover, the recording layer 3 has a transition metal-rich composition, and the supporting layer 4 has a rare earth-rich composition, as shown in FIG. 20(a). The magneto-optical recording medium is also capable of over-writing as those in the preceding two examples. It has a C/N ratio of 64 dB for a recording mark length of 5 Jm, which is better than that in Example 3-1.

Although the magneto-optical recording medium of the present invention has been described in its preferred form, it is not limited to the specific structure mentioned above. It may be modified as follows to produce the same effect.

(1) In a modified structure, a transparent substrate 1 is coated with a metal layer 6, a second dielectric layer 5, a supporting layer 4, a recording layer 3, and a first dielectric layer 2 one over another, so that the laser light enters through the first dielectric layer 2. In this case, the substrate does not always have to be transparent; but it may be replaced by one which is made of an opaque material such as metal. Moreover, the substrate may be provided with the layers on both sides. If the substrate is made of aluminum or the like which has a high reflectivity, the metal layer 6 is not necessary. It is desirable that the first dielectric layer 2 be provided with a protective layer.

(2) In another modified structure, the first dielectric layer 2, second dielectric layer 5, dielectric layer 32, and protective layer 35 are made of $SiO_x$, $AlN_x$, SiAlON, $ZnS_x$, $ZrO_x$, etc.

(3) In another modified structure, the recording layer 3 and supporting layer 4 are made of an alloy of a rare earth element (Gd, Tb, Nd, Dy, Pr, Sm, etc.) and a transition metal (Fe, Co, Ni, Cr, etc.), so that they have improved corrosion resistance. They may also be incorporated with Nb, Ti, Pt, Cr, Ta, Ni, etc.

(4) In another modified structure, the metal layer 6 may be made of any one of Al, Au, Ag, Cu, Pt, Ti, Ta, Cr, Ni, and Mn, and an alloy thereof.

What is claimed is:

1. A magneto-optical recording medium comprising a substrate and a multilayer magnetic film, wherein said multilayer magnetic film includes at least a recording layer and a supporting layer, and wherein said multilayer magnetic film exhibits a magneto-optical effect on reflected light of a laser beam irradiating the recording medium, characterized in that the recording layer has a higher Curie temperature than has the supporting layer and the recording layer has a greater coercive force than has the supporting layer at room temperature, the recording layer has a thickness of 10–50 nm, and the multilayer magnetic film has a thickness of 20–100 nm, the recording medium having properties that it can be overwritten, and read-out for verification can be performed immediately after overwriting, and wherein the recording medium further comprises a metal reflecting layer on the multilayer magnetic film.

2. A magneto-optical recording medium comprising a substrate and a multilayer magnetic film, wherein said multilayer magnetic film includes at least a recording layer and a supporting layer, and wherein said multilayer magnetic film exhibits a magneto-optical effect on reflected light of a laser beam irradiating the recording medium, characterized in that the recording layer has a higher Curie temperature than has the supporting layer and the recording layer has a greater coercive force than has the supporting layer at room temperature, the recording layer having a thickness of 10 nm to 50 nm, and the multilayer magnetic film having a thickness of 20–100 nm, the recording medium having properties that it can be overwritten, and read-out for verification can be performed immediately after overwriting, and wherein the medium further comprises (1) a metal reflecting layer provided on the multilayer magnetic film, on a side thereof opposite a side adjacent the substrate, (2) a first dielectric layer between the substrate and the multilayer magnetic film, and (3) a second dielectric layer between the metal reflecting layer and the multilayer magnetic film.

3. A magneto-optical recording medium comprising a substrate and a multilayer magnetic film, wherein said multilayer magnetic film includes at least a recording layer and a supporting layer, the supporting layer including two supporting sub-layers, and wherein said multilayer magnetic film exhibits a magneto-optical effect on reflected light of a laser beam irradiating the recording medium, characterized in that the recording layer has a higher Curie temperature than has the supporting layer and the recording layer has a greater coercive force than the two supporting sub-layers at room temperature, the recording layer has a thickness of 10–50 nm, and the multilayer magnetic film has a thickness of 20–100 nm, the recording medium having properties that it can be overwritten, and read-out for verification can be performed immediately after rewriting, and wherein the medium further comprises a metal reflecting layer on the multilaver magnetic film.

4. A magneto-optical recording medium as defined in claim 1, wherein the recording layer has a thickness in the range of 20–40 nm.

5. A magneto-optical recording medium as defined in claim 4, further comprising two dielectric layers, and wherein the multilayer magnetic film is sandwiched between the two dielectric layers.

6. A magneto-optical recording medium as defined in claim 2, wherein the recording layer has a thickness in the range of 20–40 nm.

7. A magneto-optical recording medium as defined in claim 3, wherein the recording layer has a thickness in the range of 20–40 nm.

8. A magneto-optical recording medium as defined in claim 3, wherein one of the two supporting sub-layers has a smaller coercive force, at room temperature, than the other of the two supporting sub-layers, the other of the two supporting sub-layers having a larger saturation magnetization than said one of the two supporting sub-layers.

9. A magneto-optical recording medium as defined in claim 8, wherein the two supporting sub-layers have different curie temperatures from each other, the difference being at least 3° C.

* * * * *